US007739160B1

(12) United States Patent
Ryan et al.

(10) Patent No.: US 7,739,160 B1
(45) Date of Patent: Jun. 15, 2010

(54) DYNAMIC, RULE-BASED, TAX-DECISION SYSTEM

(75) Inventors: G. Brint Ryan, Dallas, TX (US); Nigel Hoyle, Frisco, TX (US); M. Megan Martin, Rockwall, TX (US); Detlef Becker, Frisco, TX (US); Connie Fitting, Highland, CA (US)

(73) Assignee: Ryan, Inc., Dallas, TX (US)

( * ) Notice: Subject to any disclaimer, the term of this patent is extended or adjusted under 35 U.S.C. 154(b) by 1033 days.

(21) Appl. No.: 11/314,047

(22) Filed: Dec. 19, 2005

Related U.S. Application Data

(60) Provisional application No. 60/638,653, filed on Dec. 22, 2004.

(51) Int. Cl.
*G06F 17/22* (2006.01)
(52) U.S. Cl. ........................................ 705/31
(58) Field of Classification Search ........... None
See application file for complete search history.

(56) References Cited

U.S. PATENT DOCUMENTS

| 3,598,973 | A  | * | 8/1971 | Brooks et al. ............... 705/19 |
| 3,963,910 | A  | * | 6/1976 | Enomoto et al. ............. 705/19 |
| 5,875,433 | A  | * | 2/1999 | Francisco et al. ............ 705/26 |
| 6,078,899 | A  | * | 6/2000 | Francisco et al. ............ 705/19 |
| 6,141,650 | A  | * | 10/2000 | Iwasa et al. ................. 705/19 |
| 6,411,938 | B1 | * | 6/2002 | Gates et al. ................. 705/30 |
| 7,313,538 | B2 | * | 12/2007 | Wilmes et al. ............... 705/31 |
| 2002/0116302 | A1 | * | 8/2002 | Wilmes et al. ............... 705/31 |
| 2003/0040972 | A1 | * | 2/2003 | Ryan et al. .................. 705/26 |
| 2003/0040992 | A1 | * | 2/2003 | Ryan et al. .................. 705/31 |
| 2003/0144931 | A1 | * | 7/2003 | Stokes et al. ................ 705/31 |
| 2004/0002906 | A1 | * | 1/2004 | Von Drehnen et al. ........ 705/31 |
| 2004/0019522 | A1 | * | 1/2004 | Bortolin et al. .............. 705/14 |
| 2004/0024665 | A1 | * | 2/2004 | Foster ....................... 705/31 |
| 2004/0030619 | A1 | * | 2/2004 | Stokes et al. ................ 705/31 |
| 2004/0049437 | A1 | * | 3/2004 | Brikman et al. .............. 705/31 |
| 2005/0043998 | A1 | * | 2/2005 | Bross et al. ................. 705/19 |
| 2005/0209939 | A1 | * | 9/2005 | Joseph et al. ................ 705/31 |
| 2006/0085305 | A1 | * | 4/2006 | Sindambiwe ................ 705/31 |
| 2007/0043636 | A1 | * | 2/2007 | Foster ....................... 705/31 |
| 2008/0021800 | A1 | * | 1/2008 | Wilmes et al. ............... 705/31 |

* cited by examiner

*Primary Examiner*—F. Ryan Zeender
*Assistant Examiner*—Mussa Shaawat
(74) *Attorney, Agent, or Firm*—Ballard Spahr LLP

(57) ABSTRACT

A computer-implemented method and system for determining taxably relevant data is described. Data associated with a transaction is received. Transactions using the method may include purchase orders, invoices, and transactions involving contract labor, or goods previously removed from inventory. A taxable consequence is determined based on a jurisdiction code and a product code. A product code is assigned by iterating through a hierarchy of rules using singularly defined business rules and transactional data until an appropriate code is determined. An intermediate jurisdiction code is determined by iterating through a hierarchy of potential intermediate jurisdiction codes using the singularly defined business rules until the intermediate jurisdiction code is selected. An originating jurisdiction code is determined by processing the data associated with the transaction and the intermediate jurisdiction code. A destination jurisdiction code is determined in response to processing the originating jurisdiction code, wherein the taxably relevant data is thereby determined.

15 Claims, 20 Drawing Sheets

DYNAMIC, RULE-BASED, TAX-DECISION SYSTEM

CROSS REFERENCE TO RELATED APPLICATIONS

This application claims priority to U.S. Application No. 60/638,653, which was filed Dec. 22, 2004, and is hereby incorporated by reference in its entirety.

BACKGROUND

1. Field of Invention

The present invention generally relates to transactions subject to U.S. state and local sales and use tax. More specifically, the invention relates to a dynamic, rule-based, tax-decision system for determining taxably relevant data associated with a taxable transaction.

2. Description of Related Art

As technological development continues at a rapid pace, there has been a push towards more efficient business solutions that utilize enterprise software, which is computer software designed to integrate and automate all of a company's functions. Enterprise software has been used in performing many basic functions, including accounting. Enterprise software solutions are designed to provide global processes for organizations. As such, they typically offer basic tax calculations to perform sales tax calculations but do not include more complex calculations, such as use tax calculations. Consequently, enterprise software may obtain these kinds of calculations from external complex tax software packages. The use of differing platforms and the need for varying types of information, as well as other issues, may make the exchange of information between enterprise software and complex tax software packages inefficient. Enterprise software does not target the most relevant data for tax decisions and does not provide tax calculations. Thus, unmet needs remain in the current art between enterprise software and complex tax software packages.

SUMMARY

The invention is a computer-implemented method and system for determining taxably relevant data associated with a transaction using singularly defined rules. Data associated with a transaction is received. Transactions using the method may include purchase orders, invoices, and transactions involving contract labor, or goods previously removed from inventory. A taxable consequence is determined based on a jurisdiction code and a product code. A product code is assigned by iterating through a hierarchy of rules using singularly defined business rules and transactional data until an appropriate code is determined. An intermediate jurisdiction code is determined if the taxable consequence exists by iterating through a hierarchy of potential intermediate jurisdiction codes using singularly defined business rules until the intermediate jurisdiction code is selected. An originating jurisdiction code is determined by processing the data associated with the transaction and the intermediate jurisdiction code. A destination jurisdiction code is determined in response to processing the originating jurisdiction code, wherein the taxably relevant data is thereby determined.

Figure 1A:
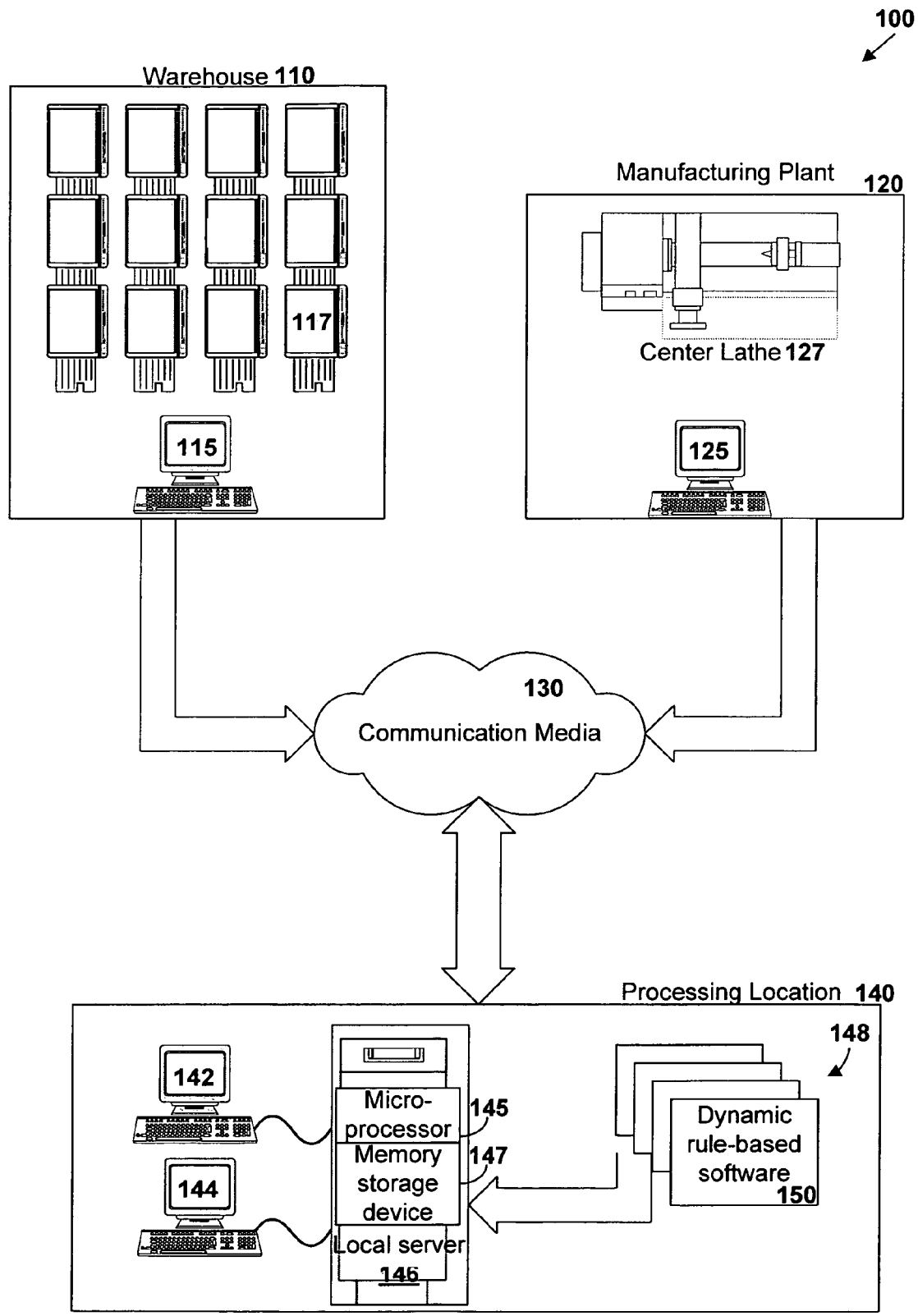
FIG. 1A is a block diagram of a dynamic, rule-based, tax-decision system in accordance with the present invention.

While the invention is susceptible to various modifications and alternative forms, specific embodiments have been shown by way of example in the drawings and subsequently are described in detail. It should be understood, however, that the description herein of specific embodiments is not intended to limit the invention to the particular forms disclosed. To the contrary, the intention is to cover all modifications, equivalents, and alternatives falling within the spirit and scope of the invention as defined by the appended claims.

DETAILED DESCRIPTION

Description of the System

FIG. 1A is a block diagram of a dynamic, rule-based, tax-decision system 100 in accordance with the present invention. In this system, information may be transmitted from various locations, such as a warehouse 110 and a manufacturing plant 120 using the communication media 130. A processing location 140 receives this information and applies it to relevant business transactions. While the warehouse 110 and the manufacturing plant 120 are shown as distinct from the processing location 140, alternative embodiments could exist where the processing location 140 is within the manufacturing plant 120 or the warehouse 110. Alternatively, the dynamic, rule-based, tax-decision system 100 could include other types of locations, such as an office building or numerous warehouses or manufacturing plants.

The warehouse 110 includes a computer 115 for monitoring the number of items in the inventory. For example, this computer may monitor the number of copiers within the warehouse. For the computer 115 to monitor this information, a warehouse operator may input inventory removal information by scanning a bar code or by inputting information using touch screens. If a copier 117 is removed from inventory, the computer 115 transmits this information to the processing location 140. Alternatively, the computer 115 may transmit information when a new item is added to the inventory within the warehouse 110. Because adding and removing items from inventory may have sales and use tax consequences, transmitting this information to the processing location 140 enables the calculation of associated sales and use taxes.

The dynamic, rule-based, tax-decision system 100 also includes a manufacturing plant 120. The manufacturing plant 120 may include various types of equipment such as a safety shower (not shown) or a center lathe 127. Like the warehouse computer 115, the computer 125 may monitor the operation of equipment in the manufacturing plant 120. If a piece of equipment should become inoperable and warrants repair, the computer 125 may download this information via the communication media 130.

Like adding and removing items from inventory, repairing equipment may also have tax consequences associated with materials and contract laborers used to complete the repair. In other words, the issuing of materials to repair a lathe 127 may have different tax consequences than the contract labor used to perform the repair. As described with reference to the computer 115, a user in the manufacturing plant 120 may insert repair information into the computer 125. This computer may then transmit the repair information to the processing location 140 using the communication media 130.

The communication media 130 facilitates the transfer of information within the dynamic, rule-based, tax-decision system 100. This communication media could be a traditional network, a wireless network, a traditional network with wireless access points, or some other suitable communication network. For example, the communication media 130 could enable communication over the Internet or an Intranet.

A processing location 140 may receive the downloaded information from the warehouse and manufacturing plant computers 115, 125. This processing location 140 may include a plurality of computers such as computer 142 and computer 144, connected to a local server 146. These computers may be used for entering purchase orders or invoices associated with a previously provided product or service. Though shown in the same physical location, an alternative embodiment may result from placing computers 142 or 144 in separate locations.

The local server 146 may include various types of hardware, firmware, and software 148. More specifically, the local server 146 may include a microprocessor 145 and a memory storage device 147. The microprocessor 145 can be any special purpose or general purpose processor capable of executing the instructions within software stored on the memory storage device 147. The memory storage device 147 can include any one or a combination of volatile memory elements (e.g., random access memory (RAM), such as DRAM, SRAM, etc.)) and non-volatile memory elements (e.g., RAM, ROM, hard-drive, tape, CDROM, etc.). Moreover, the memory storage device 147 may incorporate electronic, magnetic, optical, and/or other types of storage media. In addition, the memory storage device 147 can have a distributed architecture, where various components are situated remotely from one another, but are accessible by the microprocessor 145. The memory storage device 147 may include general accounting software, complex tax calculation software, and dynamic, rule-based, tax-decision software 150 that is easily adaptable to various systems.

With the dynamic, rule-based tax-decision software 150, the invention may be implemented within software as an ordered listing of executable instructions for implementing logical functions that can be embodied in any computer-readable medium. This medium may be for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain or store, the program for use by or in connection with the instruction execution system, apparatus, or device. Examples (a non-exhaustive list) of the computer-readable medium can include the following: a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical).

By using the dynamic, rule-based, tax-decision software 150, the dynamic, rule-based, tax-decision system 100 may determine the taxability of various business transactions using rules that are only defined once. These singularly defined business rules are applied, as needed, to individual business transactions. The process of automatically selecting and implementing the appropriate business rules to individual business transactions makes the invented automated system easily adaptable to various systems, or customizable. Therefore, the dynamic, rule-based, tax-decision system 100 may determine taxability in a host of scenarios that facilitates more accurate tax calculations. For example, the dynamic, rule-based, tax-decision system 100 may calculate sales and use tax for purchase orders, invoices, and transactions involving contract labor (i.e., contract labor (CL) transactions) or goods previously removed from inventory (i.e., goods issue (GI) transactions). In addition, the dynamic, rule-based, tax-decision system 100 may assess accrued taxes. This dynamic, rule-based, tax-decision system 100 is described in greater detail in the subsequent figures.

Figure 1B:
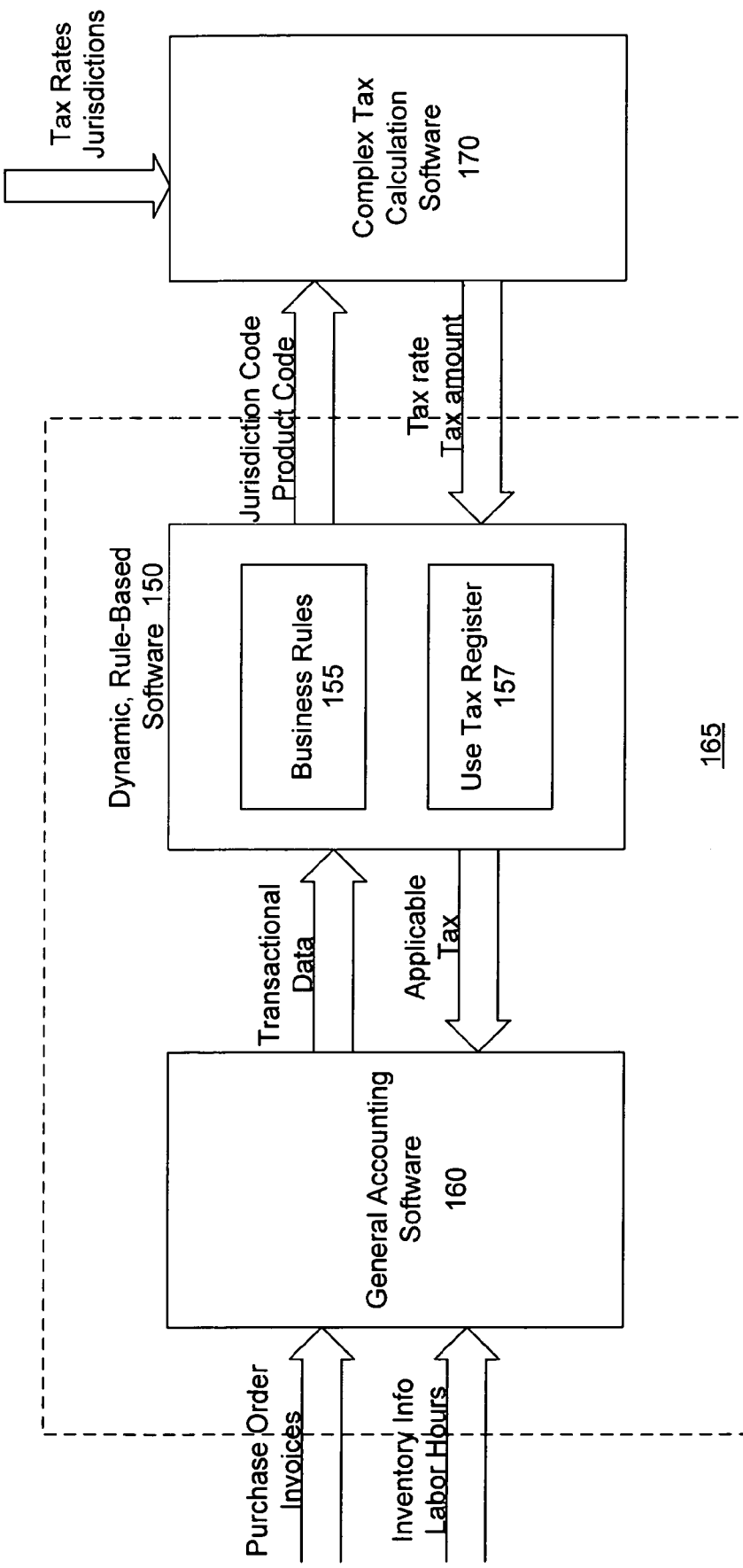
FIG. 1B is a block diagram illustrating the association of the dynamic rule-based, tax-decision software with general accounting software and complex tax-calculation software.

Please turn now to FIG. 1B. This figure is a block diagram illustrating how the dynamic, rule-based, tax-decision software 150 facilitates determining sales and use taxability and tax amounts by interfacing between the general accounting software 160 and the complex tax calculation software 170. Numerous alternative embodiments could result by combining one or more of the general accounting software 160, the dynamic, rule-based, tax-decision software 150, and the complex tax calculation software 170. For example, the general accounting software 160 and the dynamic, rule-based, tax-decision software 150 could be a single piece of software as indicated by the dotted box 165.

As noted in FIG. 1A, the server 146 may include software such as general accounting software 160. With this software, a user may enter various business transaction details, such as purchase orders, invoices, hours for contract labor, or inventory related information. One skilled in the art will appreciate that the general accounting software 160 could be any one of the various types of enterprise software, such as SAP R/3, JD Edwards, PeopleSoft, or Oracle software, etc. An example of inventory related information may include the number of copiers within the warehouse 110. After processing the received information, the general accounting software 160 exports applicable transactional data to the dynamic, rule-based, tax-decision software 150 so that appropriate taxability and tax amounts may be determined.

The dynamic, rule-based, tax-decision software 150 determines appropriate data elements to export from the general accounting software 160 to the complex tax calculation software 170, based on individual system attributes. The software 150 includes business rules 155 and a tax register 157. This dynamic, rule-based, tax-decision software 150 receives transactional data from the general accounting software 160, processes it using the business rules 155, and stores the appropriate information in the tax register 157. For purchase orders and invoices, this processing produces a unique product code that identifies both what was purchased and its intended use. For CL transactions, this dynamic, rule-based, tax-decision software 150 produces both a unique product code that identifies the type of labor utilized and the tasks performed. For CL and GI transactions, the dynamic, rule-based, tax-decision software 150 establishes an origination jurisdiction code, a destination jurisdiction code, and an order acceptance jurisdiction code. The processes used to produce the tax jurisdiction codes and product codes are described in greater detail in subsequent flow diagrams. After establishing the tax jurisdiction code and product code, the dynamic, rule-based, tax-decision software 150 exports them to the complex tax calculation software 170.

The complex tax calculation software 170 receives the exported product codes from the dynamic, rule-based, tax decision software 150 and other tax relevant information, such as tax jurisdiction codes. After receiving this information, the complex tax calculation software 170 identifies the appropriate tax rate and tax amount for each jurisdiction. One skilled in the art will appreciate the fact that the complex tax calculation software 170 could be any of various types of tax software, such as the Sabrix Sales and Use Tax Manager manufactured by Sabrix, Inc., Taxware Sales and Use Tax Solution manufactured by Taxware, LP—A subsidiary of First Data Corporation, or Vertex Sales Tax Q Series™ manufactured by Vertex, Inc. The complex tax calculation software 170 transfers the rate and tax amount information back to the dynamic, rule-based, tax-decision software 150. For CL and GI transactions, the dynamic rule-based, tax-decision software 150 then receives the taxability decision, tax rates and amounts from the tax calculation software 170. The dynamic, rule-based software 150 then prepares and exports corresponding journal entries back to the general accounting software 160 and stores this information within a use tax register 157. These processes are described in greater detail in subsequent flow diagrams.

Description of the System's Processes

Figure 2:
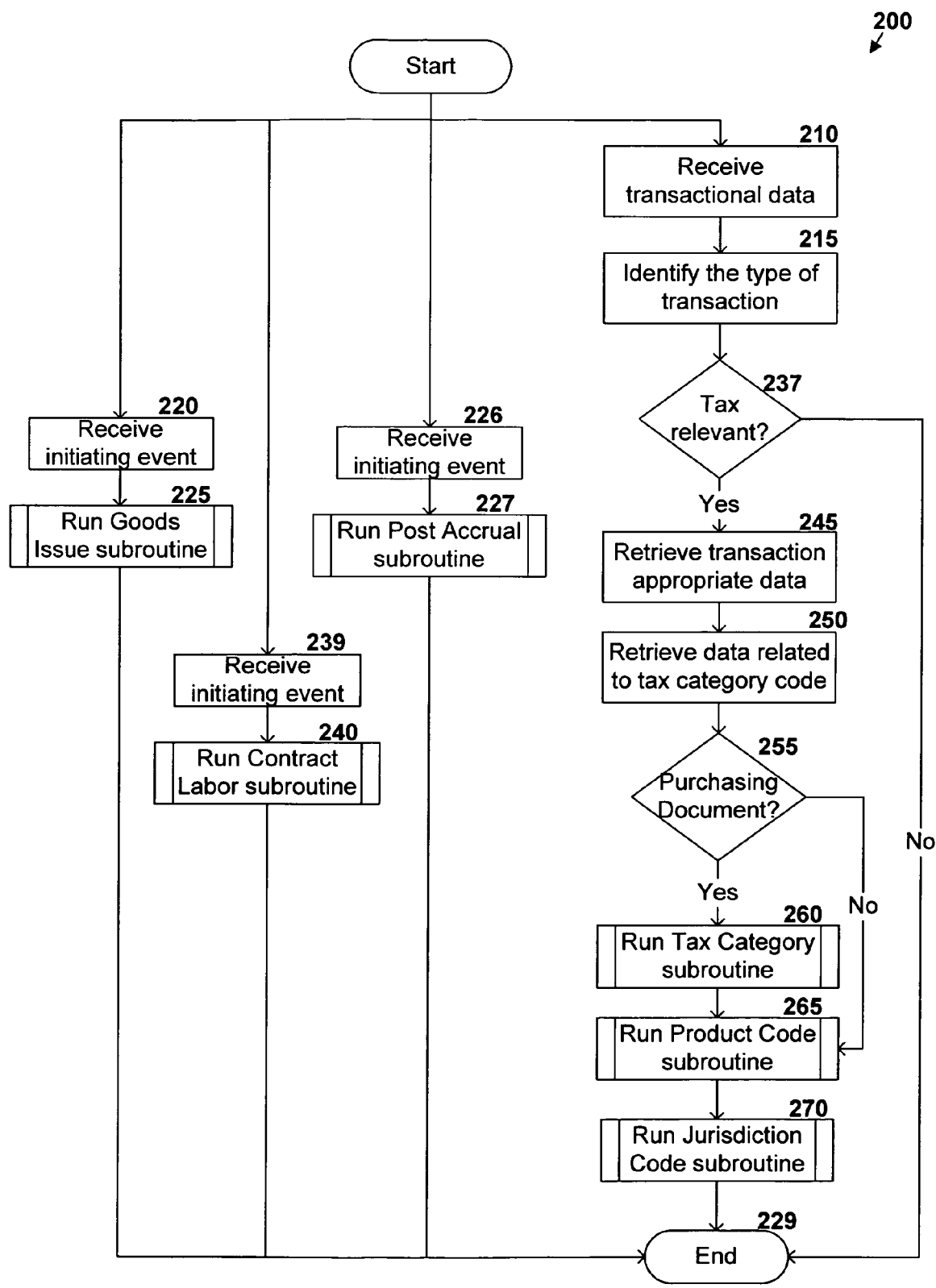
FIG. 2 is a flow diagram for a dynamic, rule-based algorithm for the dynamic, rule-based tax-decision software.

Please refer to FIG. 2. This figure is a flow diagram for a dynamic, rule-based algorithm 200 for the dynamic, rule-based, tax-decision software 150. Any process descriptions or blocks in flow charts can be understood as representing modules, or segments, which may include one or more executable instructions for implementing specific logical functions or blocks in the process. Alternative implementations are included within the scope of the invention in which functions may be executed out of order from that shown or discussed, including those substantially concurrent or in reverse order, depending on the functionality involved, as can be understood by those reasonably skilled in the art.

As indicated in the figure, this algorithm includes at least four processes that may run in parallel and are indicated by four branches. In the first branch, the rule-based algorithm begins at step 220 where it receives an initiating event. This initiating event involves GI transactions and could be one of several types of events, such as executing a batch process. GI transactions are those where adding or removing items from inventory may create a taxable consequence. Step 220 is followed by step 225. In step 225, the rule-based algorithm runs the GI subroutine 225, which is described in more detail in FIGS. 6 through 10. In the second branch, the rule-based algorithm 200 begins at step 239 where it receives an initiating event. This initiating event involves CL transactions and could be one of several types of events, such as a user executing the process as a foreground task. Step 239 is followed by step 240. In step 240, the rule-based algorithm 200 runs the CL subroutine, which is described in more detail in FIGS. 11 through 16. In the third branch, the rule-based algorithm 200 begins at step 226 where it receives an initiating event for a post-accrual transaction. This initiating event is the identification of transactions to be processed, as determined in the goods issue and contract labor subroutines. Step 226 is followed by step 227. In step 227, the rule-based algorithm 200 runs the post accrual subroutine, which is described in greater detail in FIGS. 17 through 19. The End step 229 follows steps 225, 227, and 240.

For the final branch, an event may occur such that the general accounting software 160 transfers information to the dynamic, rule-based, tax-decision software 150. This event could be initialized when tax relevant data, such as the material, price, or plant, is changed on a transaction. Generally, this change may be identified when information for a purchase order is entered into the general accounting software, for example. Because this software includes indicators for variations in tax relevant data, the general accounting software 160 can perform certain actions when a tax relevant data change occurs. When one of these events occurs, the general accounting software 160 can transfer transactional data to the dynamic, rule-based, tax-decision software 150, which can then initialize algorithm 200.

In step 210, the dynamic, rule-based algorithm 200 receives transactional data. Generally, this transactional data is received from the general accounting software 160 as previously described in FIG. 1B. More specifically, this transactional data may include vendor information, material information, prices, account assignments, partner functions, and other data. One skilled in the art will appreciate that partner functions facilitate identifying different addresses for the same vendor based on function, such as headquarters, goods supplier, or ordering address.

In Step 215, which follows step 210, the algorithm 200 identifies the type of transaction that is being executed. Types of transactions may generally include purchase orders or invoices (e.g., logistic invoice). More specifically, these transactions could be evaluated receipt settlements ("ERS") with logistic invoice verification, vendor invoices, credit memos, incoming invoices, scheduling agreements, new purchase order transactions, or other types of transactions. In executing purchase orders, the algorithm 200 can use "Enjoy" transactions when integrating with SAP R/3. "Enjoy" transactions are naming conventions for redesigned purchasing and invoicing functionality within SAP R/3. Step 215 is followed by step 237. In step 237, the algorithm 200 determines if the received transaction is relevant for tax calculation purposes. If the transaction is not relevant for tax calculation purposes, the "no" branch is followed from step 237 to End step 229. If the transaction is relevant for tax calculation purposes, the "yes" branch is followed from step 237 to step 245.

In step 245, the algorithm 200 retrieves transaction appropriate data. That is, the algorithm 200 retrieves data based on the type of transaction. For example, the data retrieved in this step for new purchase order transactions may include a purchase order header, purchase order line items, an account assignment, a purchase requisition, and partner functions. In another example, the data retrieved for an ERS with logistic invoice verification could be accounting line items, purchase order line items, and account assignments. Vendor data and accounting line items are retrieved for vendor invoices and credit memos. For scheduling agreements, contracts, and old purchase order transactions, step 245 in the algorithm 200 can retrieve the purchase order header, purchase order line items, account assignment, and purchase requisition data.

Step 245 is followed by step 250. In step 250, the algorithm 200 retrieves data related to determining the tax category code. This tax category code provides a more accurate way to identify an item purchased than provided by the general accounting software 160. Data retrieved in this step could include order type, account assignment, asset, cost center, plant, project, equipment and functional location. The decision step 255 follows step 250. In step 255, the algorithm 200 determines whether or not the received transaction was a purchasing document transaction. In making this decision, the algorithm 200 assesses whether a purchase order or an invoice was received.

If the transaction received is relevant to a purchasing document, the "yes" branch in algorithm 200 proceeds from step 255 to step 260. In step 260, the algorithm 200 runs the tax category subroutine, which is described in greater detail in FIG. 3. The tax category code subroutine 260 identifies and assigns a tax category code, a unique identifier which represents what is purchased. If a purchasing document transaction was not received, the "no" branch in algorithm 200 proceeds from step 255 to step 265. Step 260 also proceeds to step 265. In step 265, the algorithm 200 runs the product code subroutine. This subroutine determines the product code to be assigned to the transaction and passed to the external complex tax calculation software 170 and is described in greater detail in FIG. 4. After the product code is assigned in step 265, the algorithm 200 proceeds to step 270 where the jurisdiction codes are determined. Step 270 is described in greater detail in FIG. 5. The jurisdiction code step 270 subroutine identifies the appropriate jurisdiction codes associated with each purchasing document transaction. The End step 229 follows step 270.

Figure 3:
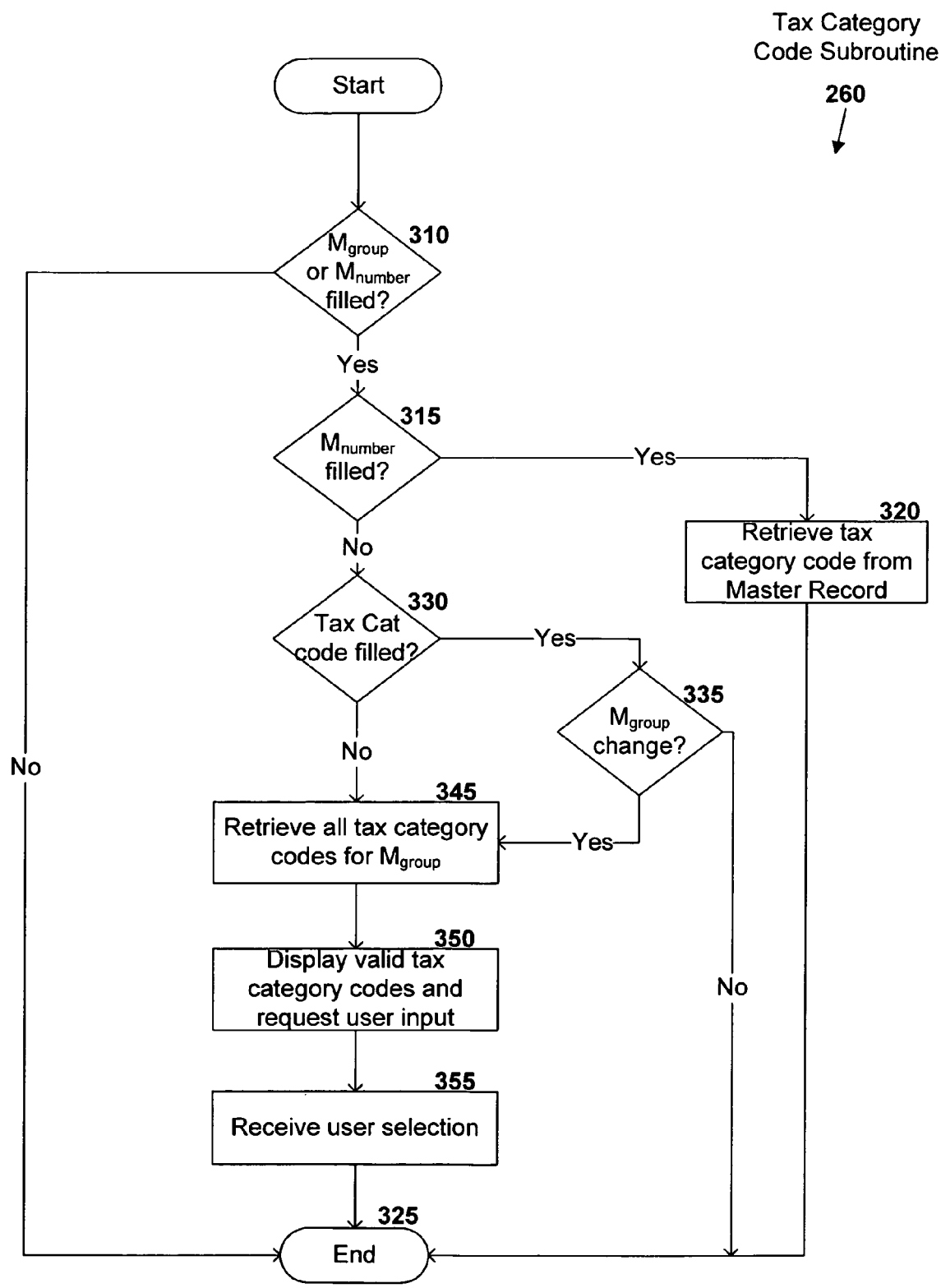
FIG. 3 is a flow diagram for the tax category subroutine listed in FIG. 2.

In FIG. 3, the tax category code subroutine 260 begins at step 310. In this step, the tax category code subroutine 260 determines if either the material group ($M_{group}$) field or the material number ($M_{number}$) field is filled in the transaction. If neither is filled, the "no" branch is followed from step 310 to the End step 325.

If either or both of the $M_{group}$ field and/or $M_{number}$ field have values, the "yes" branch is followed from step 310 to step 315. In step 315, the tax category code subroutine 260 determines if there is a value in the $M_{number}$ field. If the $M_{number}$ field is filled, the "yes" branch is followed from step 315 to step 320. In step 320, the tax category code subroutine 260 retrieves the tax category code (Tax Cat code) that is embedded in the material master record of the $M_{number}$. In essence, the Tax Cat code subroutine 260 uses the identified $M_{number}$ to retrieve this Tax Cat code. Once the Tax Cat code subroutine 260 has identified the Tax Cat code, step 320 proceeds to End step 325.

If the $M_{number}$ field is not filled in step 315, the "no" branch is followed from step 315 to step 330. In step 330, the Tax Cat code subroutine 260 determines whether the Tax Cat code field is filled. If this field is not filled, the "no" branch is followed from step 330 to 345. If this field is filled, the "yes" branch is followed from step 330 to step 335. In step 335, the Tax Cat code subroutine 260 determines whether the $M_{group}$ field has changed from the previously selected group. If the $M_{group}$ field has not been altered, the "no" branch is followed from step 335 to the End step 325. Otherwise, the "yes" branch is followed from step 335 to step 345.

If the Tax Cat code is not filled or if the $M_{group}$ changed step 345 is completed. In the step 345, the Tax Cat code subroutine 260 retrieves all the Tax Cat codes for the identified $M_{group}$. Step 345 is followed by step 350, which displays the valid Tax Cat codes and requests a user's input. Step 350 is followed by step 355, which receives the user's selection. Consequently, the user selects the appropriate Tax Cat code. The End step 325 follows step 355. Processing for the Tax Cat code subroutine 260 is complete when End step 325 is reached.

Figure 4:
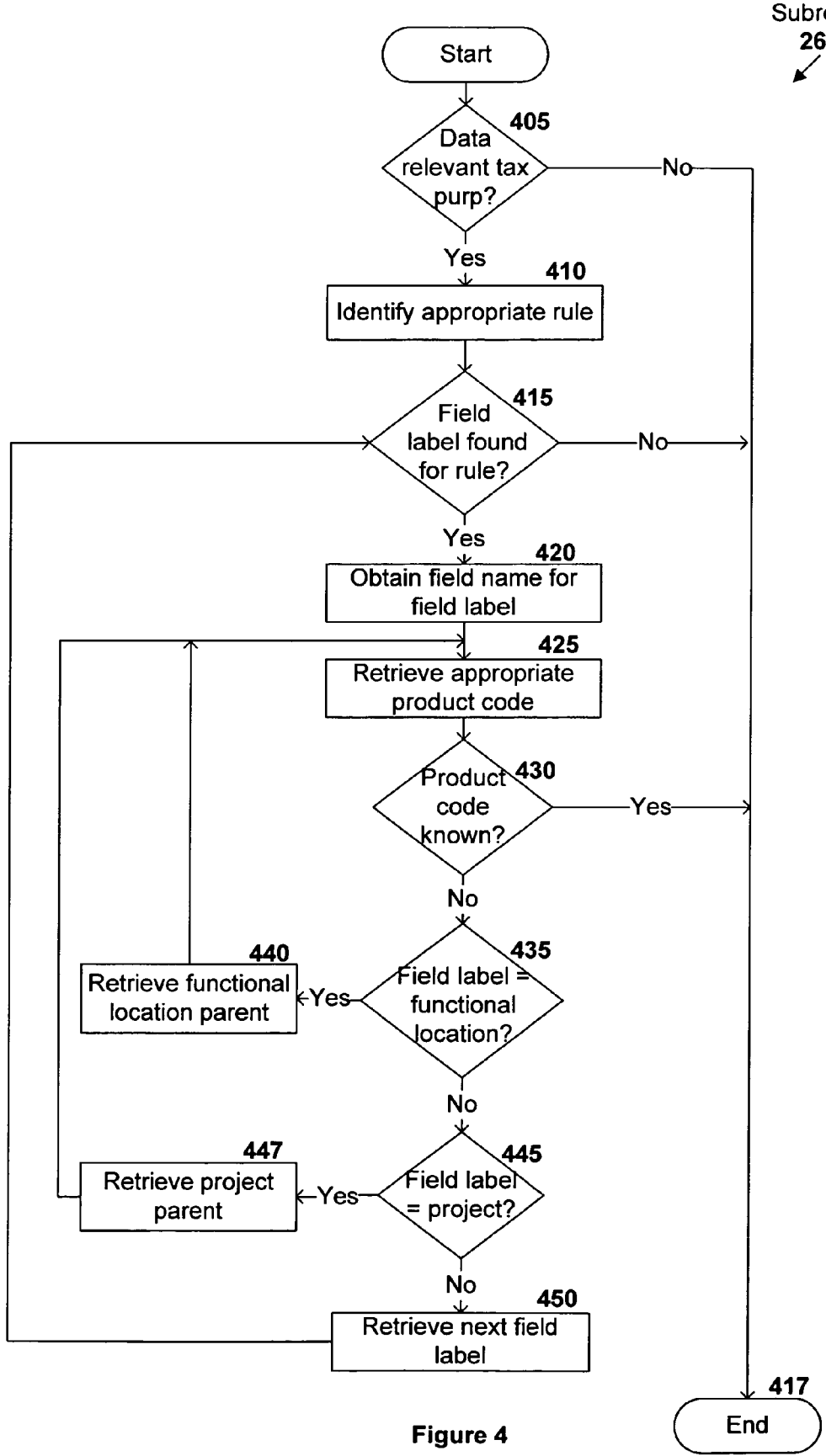
FIG. 4 is a flow diagram for the product code subroutine listed in FIG. 2.

In FIG. 4, the product code subroutine 265 begins at step 405 by determining if the received data is relevant for tax purposes. Applicable transaction codes, account assignments to order type combinations and associated tax rule types are contained in a custom transaction table to make this determination. For transactions that do not use an account assignment indicator, the technical field names are used instead to represent the equivalent account assignment indicator. In determining whether the received transaction is relevant for tax purposes, the product code subroutine 265 considers purchase orders, GI, and invoice transactions as relevant to tax. For example, an inventory GI item issued to a plant maintenance work order is relevant for tax purposes. If the transaction is not relevant for tax purposes, the "no" branch is followed from step 405 to the End step 417.

When the transaction is relevant for tax purposes, step 405 proceeds to step 410. In step 410, the product code subroutine 265 identifies the rule associated with the executed data in the transaction using a table lookup, such as a custom transaction table. In this manner, the product code subroutine 265 can tailor the product code assigned to the type of transaction data being executed. For example, executing transaction data associated with a purchase of office supplies against a cost center could result in a different rule selection than transaction data for an equipment purchase in the same cost center.

The decision step 415 follows step 410. In step 415, the product code subroutine 265 determines whether or not there is an associated field label for the identified rule. A field label is a descriptive label that describes the rule. That is, it serves as a pointer to the actual physical value of the rule. The custom rules table contains a list of field labels that is read in sequence for each rule type. If the field label is not found, the "no" branch is followed from step 415 to the End step 417.

If there was an associated field label, the "yes" branch is followed from step 415 to step 420. In step 420, the product code subroutine 265 obtains the field name for the field label. In this step, the product code subroutine 265 determines the actual location where the rule is stored. In other words, the field labels are read in sequence for the specific rule. If the rule is found, then the associated technical field name for the field label is obtained from the custom fields table.

Step 425 follows step 420. In step 425, the product code subroutine 265 retrieves the appropriate product code. For the value of each field label that has been identified from the executing transaction, a custom rule type table is read to identify the product code. The custom rule type table contains the field label, its value, and its applicable product code. By retrieving the rule in step 410 and using the custom rule type table, the product code subroutine 265 can determine the appropriate product code. Consequently, the product code subroutine 265 attempts to retrieve this code in step 425.

Step 430 follows step 425. In step 430, the product code subroutine 265 determines whether the product code is known. In essence, the product code subroutine 265 determines whether the effort in the previous steps to retrieve the product code was successful. If the product code is known, the "yes" branch is followed from step 430 to the End 417 and processing is complete.

If the product code is not known, the "no" branch is followed from step 430 to step 435. In step 435, the product code subroutine 265 determines whether one of the field labels has a functional location associated with the executed data. A functional location is a data element that identifies a logical location within a plant or manufacturing facility. If there is a functional location, the "yes" branch is followed from step 435 to step 440. In step 440, the product code subroutine 265 retrieves the parent functional location for the current functional location. If the field label contains a functional location, then the value for the next level in the functional location hierarchy is obtained and the custom rule type table is read to determine the product code. Steps 435, 440, and 425 are repeated until the top-level parent is processed or a product code is determined. In step 425, the product code subroutine 265 attempts once again to retrieve the appropriate product code. The product code subroutine then repeats steps 425, 430, and 435.

If the product code subroutine 265 determines that there was not a functional location in step 435, the "no" branch is followed from step 435 to step 445. In step 445, the product code subroutine 265 determines whether the executed transaction data has a field label associated with a project. A project is an internal job where tracking is desired, such as activities, costs, and timelines. If the product code subroutine 265 determines that a project was processed at step 445, the "yes" branch is followed from step 445 to step 447. In step 447, the product code subroutine 265 retrieves the project parent. If the field label contains a project, then the value for the next higher level in the project hierarchy is obtained and the custom rule type table is read to determine the product code. Steps 445, 447, and 425 are repeated until the top-level parent is processed or a product code is determined. In step 425, the product code subroutine 265 attempts once again to retrieve the appropriate product code. The product code subroutine then repeats steps 425, 430, 435, and 445.

If it was determined in step 445 that a project was not processed, the "no" branch is followed from step 445 to step 450. In step 450, the product code subroutine 265 retrieves the next field label. There can be numerous field labels to identify the rules to apply to a single account assignment document.

Figure 5:
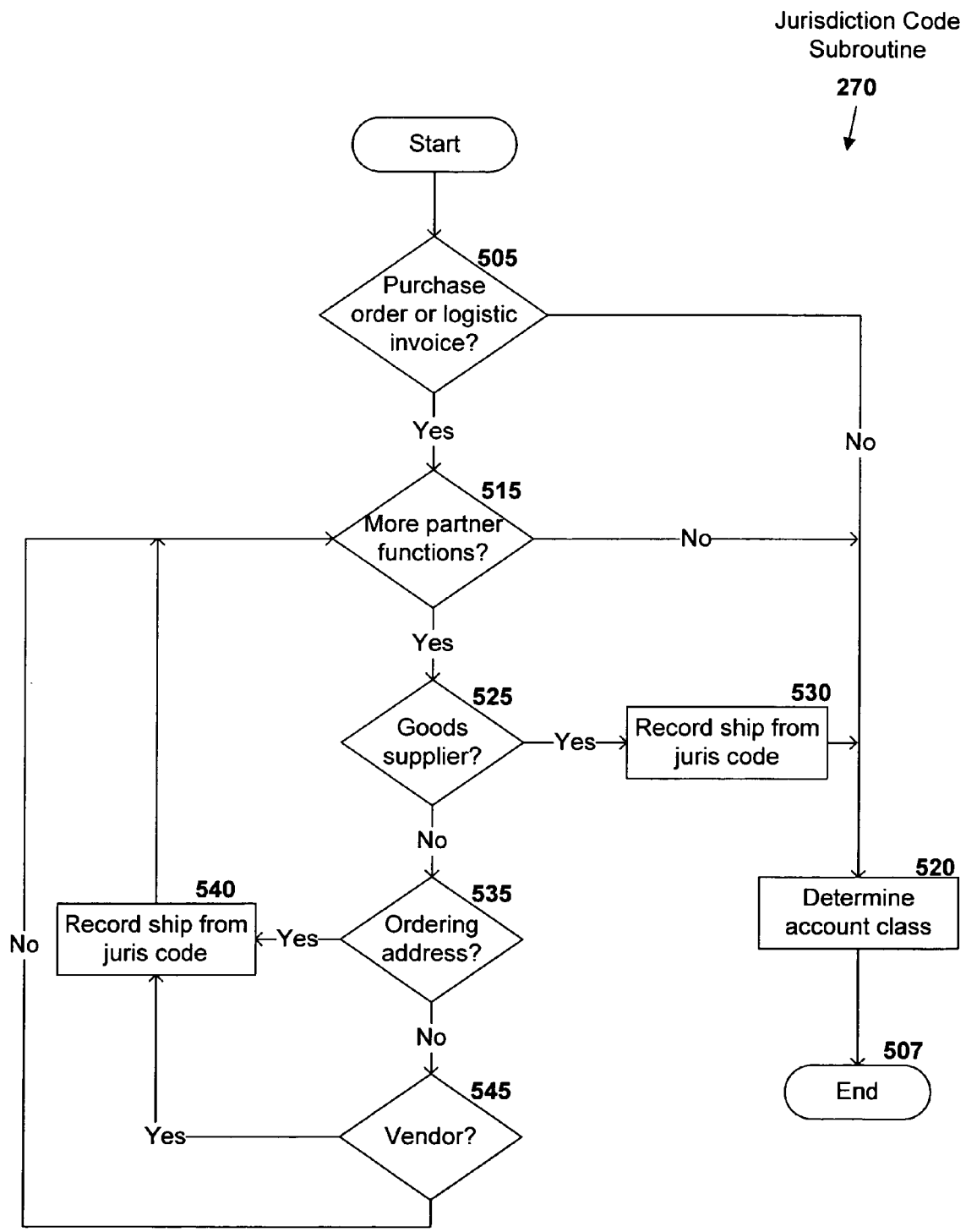
FIG. 5 is a flow diagram for the jurisdiction code subroutine listed in FIG. 2.
Figure 6:
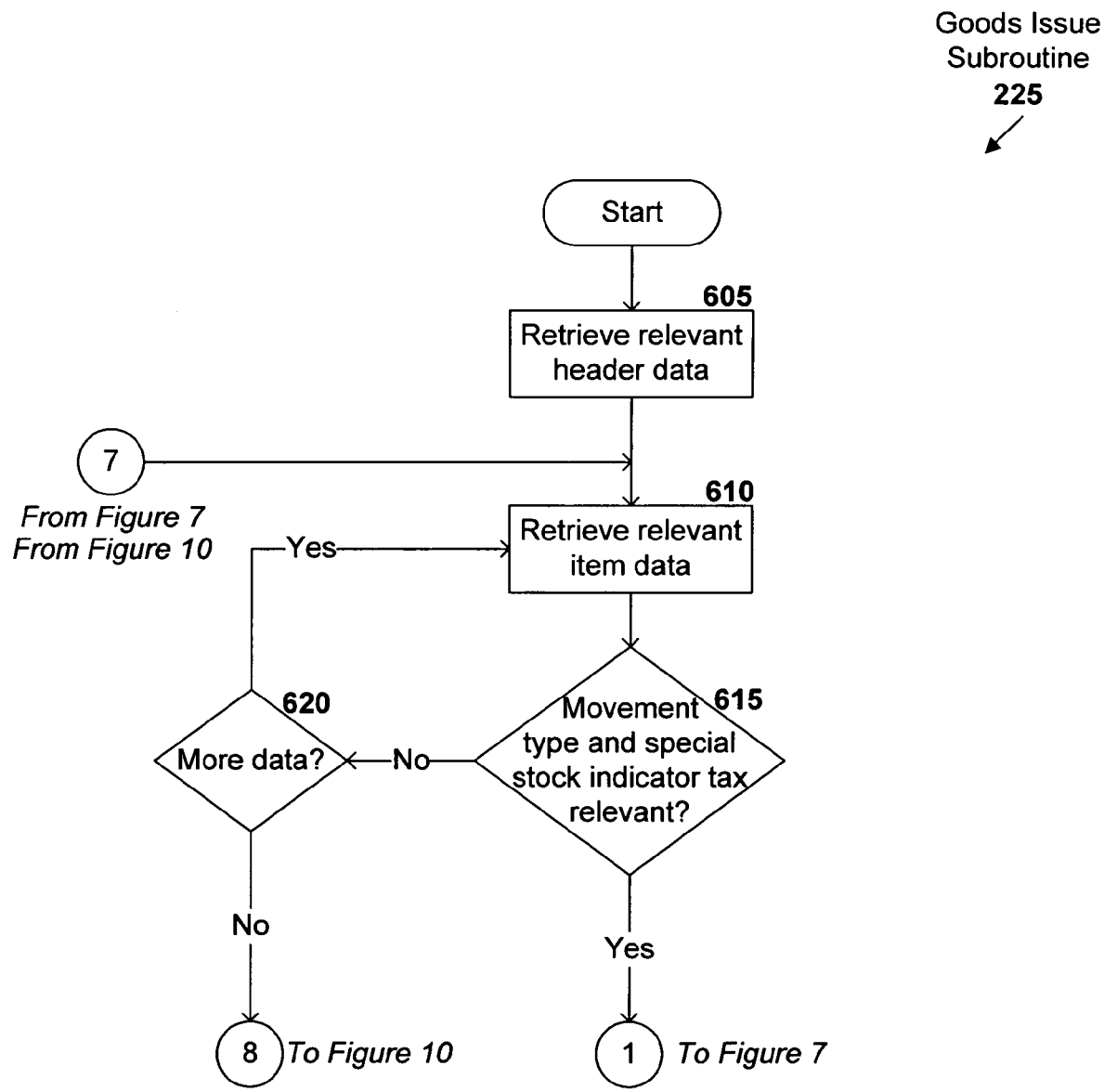
FIG. 6 is a flow diagram for the beginning of the goods-issue subroutine listed in FIG. 2.

FIG. 5 outlines the jurisdiction code subroutine 270, which begins at step 505 and ends at step 507. In step 505, the jurisdiction code subroutine 270 determines whether a purchase order or a logistic invoice was received. If neither was received, the "no" branch is followed from step 505 to step 520. In step 520, the jurisdiction code subroutine 270 determines the account class. Step 520 is followed by the End step 507.

If either a purchase order or logistic invoice was received in step 505, the jurisdiction code subroutine 270 follows the "yes" branch from step 505 to step 515. In step 515, the jurisdiction code subroutine 270 determines whether there are any more partner functions. If there are no more partner functions, the "no" branch is followed from step 515 to step 520. As mentioned above, step 520 is followed by the End step 507.

If there were more partner functions, the "yes" branch is followed from step 515 to step 525. More partner functions refer to multiple addresses with different functions for the same vendor. When the "yes" branch is followed, additional addresses remain for the particular vendor, so jurisdiction code subroutine 270 steps proceed from 515 through 525, 535, and 544 to locate the additional addresses. In step 525, the jurisdiction code subroutine 270 determines whether the current partner function is a goods supplier. If the current partner function is a goods supplier, the "yes" branch is followed from step 525 to step 530. In step 530, the jurisdiction code subroutine 270 records the jurisdiction code of the partner as the "ship from" jurisdiction code. Step 530 is followed by step 520.

If the current partner function was not a goods supplier, the "no" branch is followed from step 525 to step 535. In step 535, the jurisdiction code subroutine 270 determines whether the current partner function is an ordering address. If the current partner function is an ordering address, the "yes" branch is followed from step 535 to step 540. In step 540, the jurisdiction code records the "ship from" jurisdiction code. Step 540 is followed by step 515.

If the current partner function is not an ordering address, the "no" branch is followed from step 535 to step 545. In step 545, the jurisdiction code subroutine 270 determines whether or not the current partner function is a vendor. If the current partner function is a vendor, the "yes" branch is followed from step 545 to step 540. In step 540, the jurisdiction code records the "ship from" jurisdiction code. If the current partner function is not a vendor, the "no" branch is followed from step 545 to step 515.

FIGS. 6 through 10 illustrate the processes within the GI subroutine 225 that are described in FIG. 2. Algorithm 200 runs this subroutine after determining that the transaction data contains GI transactions. The GI subroutine 225 identifies material movement documents which are relevant for tax consequences and determines the appropriate jurisdiction codes. It then transfers this information to the complex tax calculation software 170 to determine whether any taxes are due. After this determination, the GI subroutine 225 stores relevant tax data in the use tax register 157, FIG. 1B.

The GI subroutine 225 begins at step 605. In step 605, the GI subroutine 225 retrieves relevant header data for the transaction. This relevant data can include the company code, fiscal year, and fiscal period entered on a data entry screen. Step 610 follows step 605. In step 610, the GI subroutine 225 retrieves relevant item data, which can include the material document line record for the current material document header record.

The decision step 615 follows step 610. In step 615, the GI subroutine 225 determines whether or not the movement type and/or special stock indicator are relevant for tax consequences. In other words, the GI subroutine 225 recognizes that removing items from inventory for intra-store transfer and stock shrinkage does not create any consequences, while removing stock items for maintenance repair can have tax consequences. A special stock indicator facilitates identifying materials that are separately managed because of ownership or location where they are kept, such as consignment stocks from vendors.

If the movement type and special stock indicator is not tax relevant, the "no" branch is followed from step 615 to step 620. In step 620, the GI subroutine determines if there is more GI data available for processing. If there is more data available for processing, the "yes" branch is followed from step 620 to step 610 and the GI subroutine repeats steps 610, 615. Otherwise, the "no" branch is followed from step 620 to the end step 1030 (See FIG. 10) and the GI subroutine 225 ends.

Figure 7:
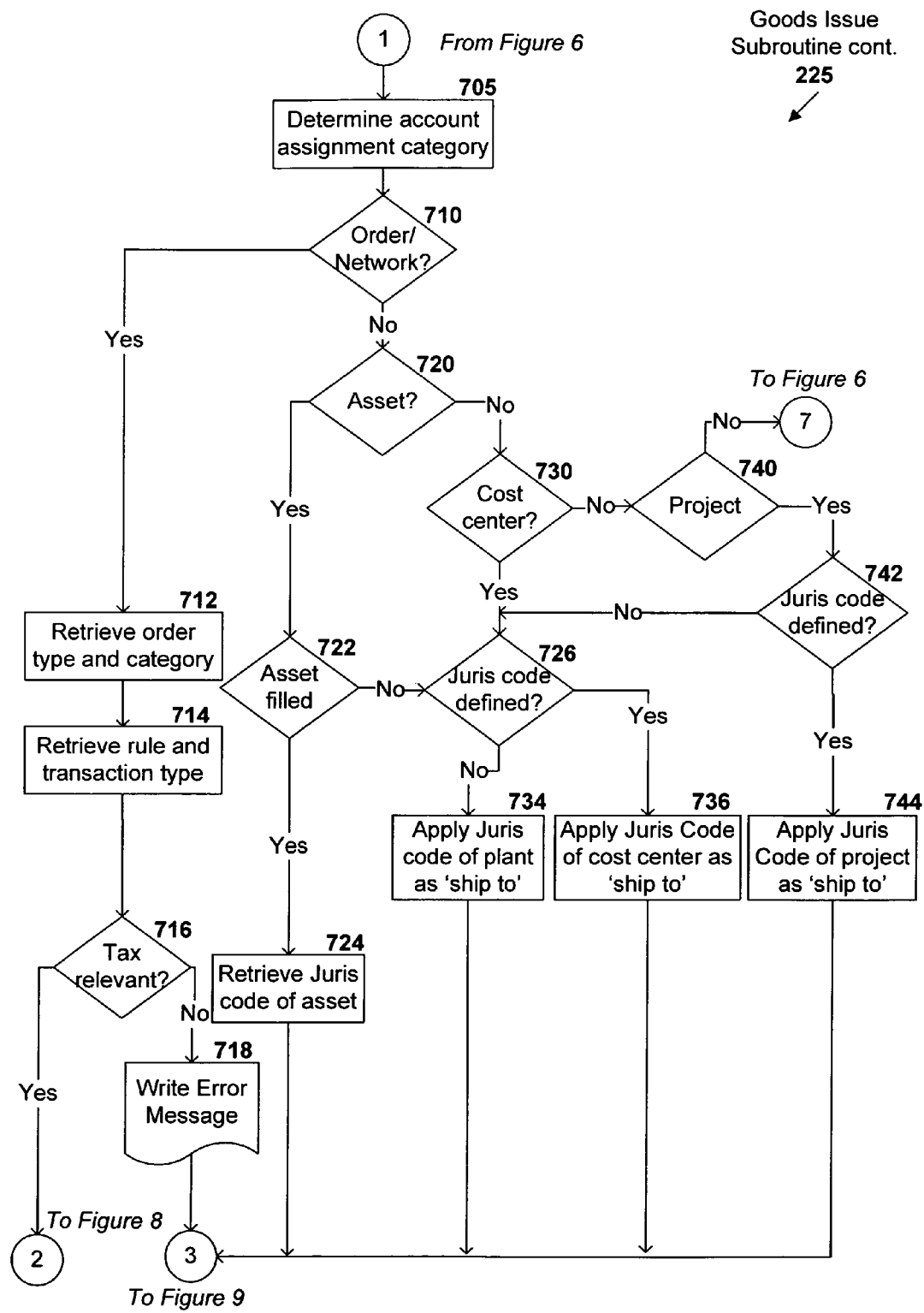
FIG. 7 is a flow diagram that continues from the goods-issue subroutine listed in FIG. 6.

If the movement type and/or special stock indicator have tax relevance, the "yes" branch is followed from step 615 to step 705 (See FIG. 7). In step 705, the GI subroutine 225 determines which account assignment is associated with the current transaction using the material documents line in the material document header. Step 710 follows step 705. In step 710, the GI subroutine 225 determines whether the transaction corresponds to a purchase order or to a network. A network is a part of a project that represents the flow of a project or task within the project. If an order or network is executed, the "yes" branch is followed from step 710 to step 712. In step 712, the GI subroutine 225 retrieves information on the type of order and category.

Step 714 follows step 712. In step 714, the GI subroutine 225 retrieves the rule and transaction type applicable to the order. Step 714 is followed by the decision step 716. In step 716, the GI subroutine 225 determines if the transaction is relevant for tax based on the retrieved rule and transaction type. If there is tax relevance, the "yes" branch is followed from step 716 to step 805 (see FIG. 8). If there is not tax relevance, the "no" branch is followed from step 716 to step 718. In step 718, the GI subroutine 225 writes an error message in an error log. Step 718 is then followed by step 935 (See FIG. 9).

If the GI subroutine 225 determines that the account assignment does not correspond to an order or a network at step 710, the "no" branch is followed from step 710 to step 720. In step 720, the GI subroutine 225 determines if the account assignment is related to an asset. If the item is for an asset, the "yes" branch is followed from step 720 to step 722. In step 722, the GI subroutine 225 determines whether the asset field is blank or contains a value. If the asset field contains a value, the "yes" branch is followed from step 722 to step 724. In step 724, the GI subroutine 225 retrieves the jurisdiction code associated with the asset. Step 724 is followed by step 935 (See FIG. 9).

In step 722, if the asset field is not filled, the "no" branch is followed to step 726. In step 726, the GI subroutine 225 determines if a jurisdiction code is defined for a previously identified cost center. Step 726 is either followed by step 734 or step 736 as described below.

If the GI subroutine 225 determines that the account assignment does not correspond to an asset in step 720, the "no" branch is followed from step 720 to step 730. In step 730, the GI subroutine 225 determines if the account assignment corresponds to a cost center. If it does, the "yes" branch is followed from step 730 to step 726. As described above, the GI subroutine 225 determines the jurisdiction code for the cost center in step 726.

If the jurisdiction code of the cost center is not defined, the "no" branch is followed from step 726 to step 734. In this step, the GI subroutine 225 uses the jurisdiction code of the material line movement plant as the "ship to" jurisdiction code. If the jurisdiction code of the cost center is defined in step 726, the "yes" branch is followed from step 726 to step 736. In step 736, the GI subroutine 225 uses the jurisdiction code of the cost center as the "ship to" jurisdiction code.

If the GI subroutine 225 determines that the transaction does not correspond to a cost center in step 730, the "no" branch is followed from step 730 to step 740. In step 740, the GI subroutine 225 determines whether or not the account assignment corresponds to a project. If the account assignment does not relate to a project, the "no" branch is followed from step 740 to step 610 (see FIG. 6). If the account assignment is relevant to a project, the "yes" branch is followed from step 740 to step 742. In step 742, the GI subroutine 225 determines if a jurisdiction code is defined for the project. If a jurisdiction code is defined for the project, the "yes" branch is followed from step 742 to step 744. In step 744, the GI subroutine 225 uses the jurisdiction code of the project as the "ship to" jurisdiction code. If the GI subroutine 225 determines that a jurisdiction code is not defined at step 742, the "no" branch is followed from step 742 to step 726, which was described above.

Figure 8:
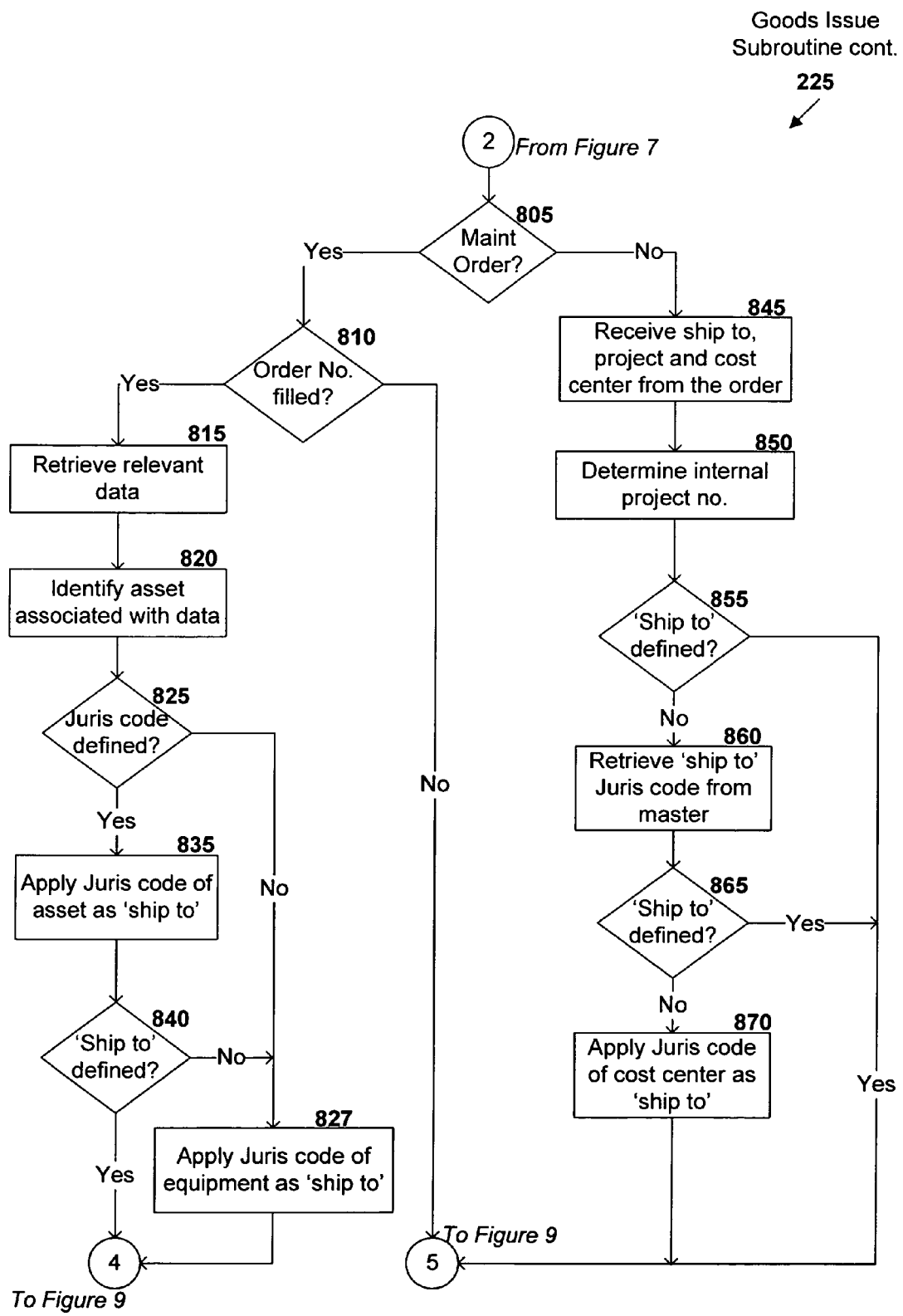
FIG. 8 is a flow diagram that continues from the goods-issue subroutine listed in FIG. 7.

Turning now to FIG. 8, the GI subroutine 225 begins at step 805 after the tax relevant decision step 716 described in FIG. 7. In step 805, the GI subroutine 225 determines if the account assignment corresponds to a maintenance order. If it is for a maintenance order, the "yes" branch is followed from step 805 to step 810. In step 810, the GI subroutine 225 determines if the order number field is filled. If the order number field is not filled, the "no" branch is followed from step 810 to step 925 (see FIG. 9).

If the order number field is filled, the "yes" branch is followed from step 810 to step 815. In step 815, the GI subroutine 225 retrieves data relevant to the maintenance order, such as equipment number, functional location, and company. Step 820 follows step 815 and the GI subroutine 225 identifies the asset associated with the received data on the maintenance order.

Decision step 825 follows step 820. In step 825, the GI subroutine 225 determines if the jurisdiction code is defined for the asset. If this jurisdiction code is not defined for the asset, the "no" branch is followed from step 825 to step 827. In step 827, the GI subroutine 225 applies the jurisdiction code of the equipment identified in step 820 as the "ship to" jurisdiction code. Step 827 is followed by step 905 (see FIG. 9).

If the jurisdiction code for the asset is defined in step 825, the "yes" branch is followed from step 825 to step 835. In step 835, the GI subroutine 225 applies the jurisdiction code of the asset as the "ship to" jurisdiction code. Step 835 is followed by decision step 840.

In step 840, the GI subroutine 225 determines if the "ship to" jurisdiction code is actually defined. That is, this step checks to see if step 835 was successful. If the "ship to" jurisdiction code is defined, the GI subroutine 225 follows the "yes" branch from step 840 to step 905 (see FIG. 9). If the "ship to" is not defined, the "no" branch is followed from step 840 to step 827. In step 827, the GI subroutine 225 uses the jurisdiction code of the equipment, as previously described.

If the GI subroutine 225 determines that the account assignment does not correspond to a maintenance order in step 805, the "no" branch is followed from step 805 to step 845. For example, the account assigned can be for an internal order. An internal order can be used to measure costs, and in some instances, the revenue for an organization. Alternatively, the account assignment can be for a project. A project differs from an internal order because projects are normally used for long term jobs for any purpose where tracking is desired, such as activities, costs, and timelines. Some examples of projects could be an expansion or refurbishment of a manufacturing plant or purchasing of any equipment to be capitalized.

In step 845, the GI subroutine 225 applies the jurisdiction code of the project and cost center as the "ship to" jurisdiction code. Step 850 follows step 845, which is the step where the internal project number is retrieved. Step 850 is followed by the decision step 855. In this step, the GI subroutine 225 determines whether or not the "ship to" jurisdiction code field is defined. If the "ship to" jurisdiction code is defined, the "yes" branch is followed from step 855 to step 925 (see FIG. 9).

If the "ship to" jurisdiction code is not defined in step 855, the "no" branch is followed from step 855 to step 860. In step 860, the GI subroutine 225 retrieves the "ship to" jurisdiction code from the project master table. The step 860 is followed by the decision step 865. In this step, the GI subroutine 225 determines if a "ship to" jurisdiction code field is defined. In other words, this step assesses whether or not step 860 was successful. If the "ship to" jurisdiction code is not defined, the "no" branch is followed from step 865 to step 870 where the jurisdiction code of the cost center is used as the "ship to" jurisdiction code. The "yes" branch of step 865 and the completion of step 870 are followed by step 925 (see FIG. 9).

Figure 9:
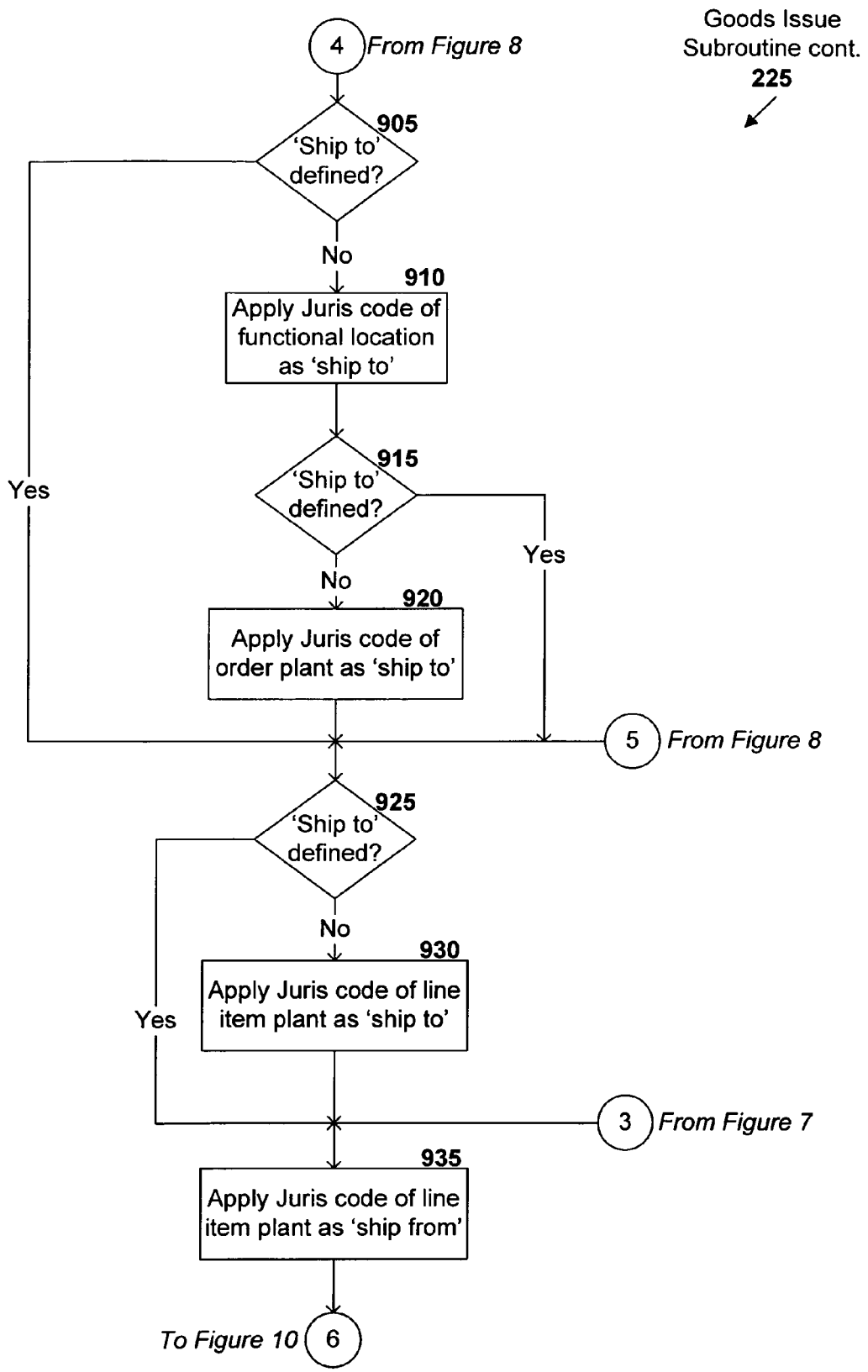
FIG. 9 is a flow diagram that continues from the goods-issue subroutine listed in FIG. 8.

Turning now to FIG. 9, the GI subroutine 225, begins with step 905 by determining if the "ship to" jurisdiction code field is defined. This step continues from steps 827 and 840 (FIG. 8). If the "ship to" jurisdiction code is found in step 905, the "yes" branch is followed from step 905 to step 925, which is described below; otherwise, the "no" branch is followed from step 905 to step 910. In step 910, the GI subroutine 225 applies the jurisdiction code of the functional location as the "ship to" jurisdiction code. The jurisdiction code of the functional location is determined in step 827 of FIG. 8. Step 910 is followed by the decision step 915.

In step 915, the GI subroutine 225 determines whether or not the "ship to" jurisdiction code is defined. If the "ship to" jurisdiction code is defined, the "yes" branch is followed from step 915 to step 925. Otherwise, the "no" branch is followed from step 915 to step 920. In step 920, the GI subroutine 225 applies the jurisdiction code of the order plant as the "ship to" jurisdiction code.

Step 920 is followed by the decision step 925. In step 925, the GI subroutine 225 determines whether or not the "ship to" jurisdiction code is defined. If the "ship to" jurisdiction code is not defined, the "no" branch is followed from step 925 to step 930. In step 930, the GI subroutine 225 applies the jurisdiction code of the material document line item issuing plant as the "ship to" jurisdiction code. Step 930 is followed by step 935. Step 935 also follows step 925 when the "ship to" jurisdiction code is defined. In step 935, the GI subroutine 225 applies the jurisdiction code of the issuing plant on the material document line item as the "ship from" jurisdiction code. Step 935 is followed by step 1005 (see FIG. 10).

Figure 10:
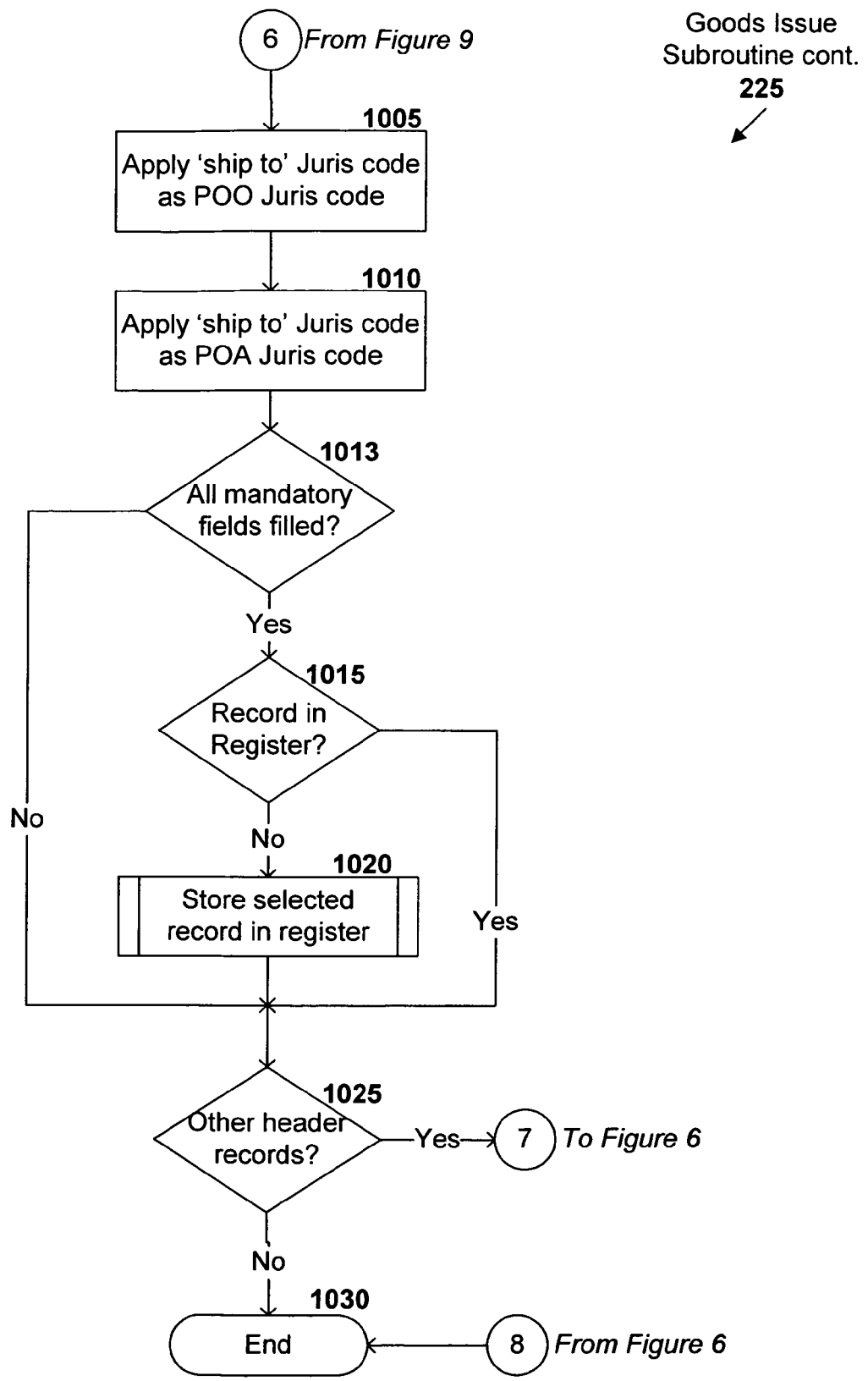
FIG. 10 is a flow diagram that continues from the goods-issue subroutine listed in FIG. 9.
Figure 11:
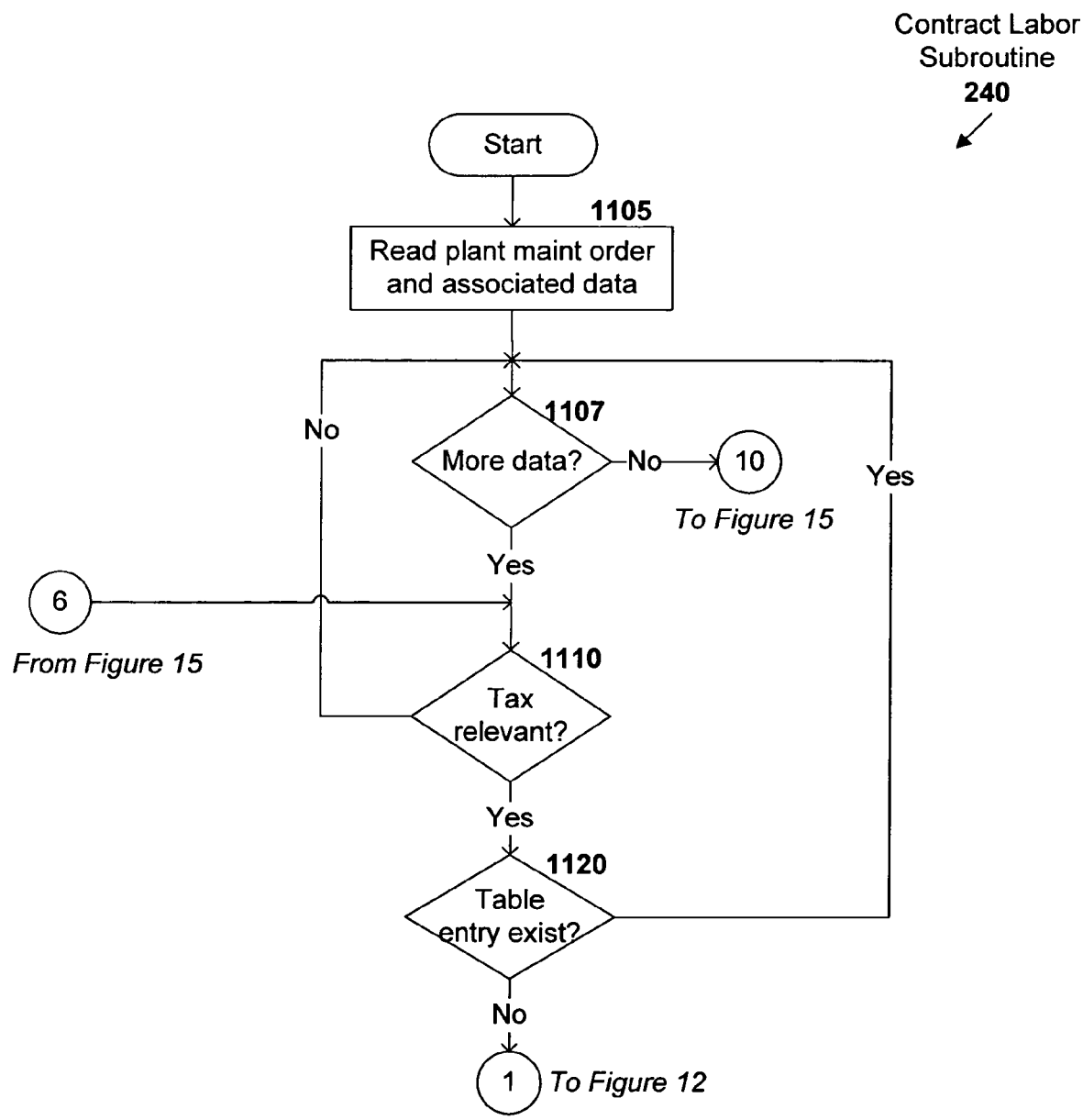
FIG. 11 is a flow diagram for the beginning of the contract-labor subroutine listed in FIG. 2.

Turning now to FIG. 10, the GI subroutine 225 begins at step 1005 by applying the "ship to" jurisdiction code as the point of order origin ("POO") jurisdiction code. Making this designation facilitates calculation of taxes based on the regional area designated as the origin of the order for goods/services. Step 1005 is followed by step 1010. In step 1010, the GI subroutine 225 applies the "ship from" jurisdiction code as the point of order acceptance ("POA") jurisdiction code. This step assigns a regional location to the place designated as the point of order acceptance. Step 1010 indicates that the point of acceptance and point of origin can be the same location.

Step 1010 is followed by the decision step 1013. In this step the GI subroutine 225 determines if all mandatory fields are filled. If the mandatory fields are not filled, the "no" branch is followed from step 1013 to step 1025. Otherwise, the "yes" branch is followed from step 1013 to step 1015. In step 1015, the GI subroutine 225 determines if the record already exists within the use tax register 157 (FIG. 1B). If the record does not exist in the use tax register 157, the "no" branch is followed from step 1015 to step 1020 and the record is stored using the storing subroutine. A person skilled in the art of programming can appreciate that the subroutine 1020 could be any one of many conventional storing subroutines. If the record already exists in the use tax register 157, the "yes" branch is followed from step 1015 to decision step 1025. In step 1025, the GI subroutine 225, determines if there are other header records. That is, this subroutine determines if other records need to be processed or if the last record has been reached. If there are other records, the "yes" branch is followed from step 1025 to step 610 (see FIG. 6) and the GI subroutine 225 begins again. If there is not another header record, the "no" branch is followed from step 1025 to the End step 1030. As the GI subroutine 225 ends, the algorithm 200 also ends (see FIG. 2).

FIGS. 11 through 16 illustrate the processes within the CL subroutine 240 that are described in FIG. 2. Algorithm 200 runs this subroutine after determining that the transaction data contains contract labor transactions. The contractor labor subroutine 240 determines whether or not hourly contract labor costs that were charged on plant maintenance work orders or projects are relevant for tax. If they are relevant, the CL subroutine 240 calls complex tax calculation software 170 to perform a tax calculation, and applies this tax to the appropriate work order or project.

The CL subroutine 240 begins at step 1105 by reading the plant maintenance order and associated data. The associated data could be order confirmation data, which provides specific details on the order and confirms hours within an order. Step 1105 is followed by the decision step 1107. In this step, the CL subroutine 240 determines whether or not there is more contract labor data awaiting processing. If there is no more data, the CL subroutine 204 follows the "no" branch from step 1107 to step 1525 (See FIG. 15). Otherwise, the "yes" branch is followed from step 1107 to the decision step 1110. In this step, the CL subroutine 240 determines if the data gathered in the previous step has any tax relevance. To make this assessment, this subroutine considers both the activity type and order type for the contract labor.

If the CL subroutine 240 determines that the order does not have any taxable relevance, the "no" branch is followed from step 1110 to the decision step 1107 and step 1107 is repeated. In step 1107, this subroutine retrieves the next order. If the data did have taxable relevance, the "yes" branch is followed from step 1110 to step 1120. In this step, the CL subroutine 240 determines if an entry exist in the use tax register 157 for this data. If there is an entry in this table, the CL subroutine 240 follows the "yes" branch from step 1120 to step 1107. If there is not an entry in the use tax register 157, the "no" branch is followed from step 1120 to step 1205 (see FIG. 12). One skilled in the art will appreciate that any transaction that updates the use tax register 157 creates a table entry.

Figure 12:
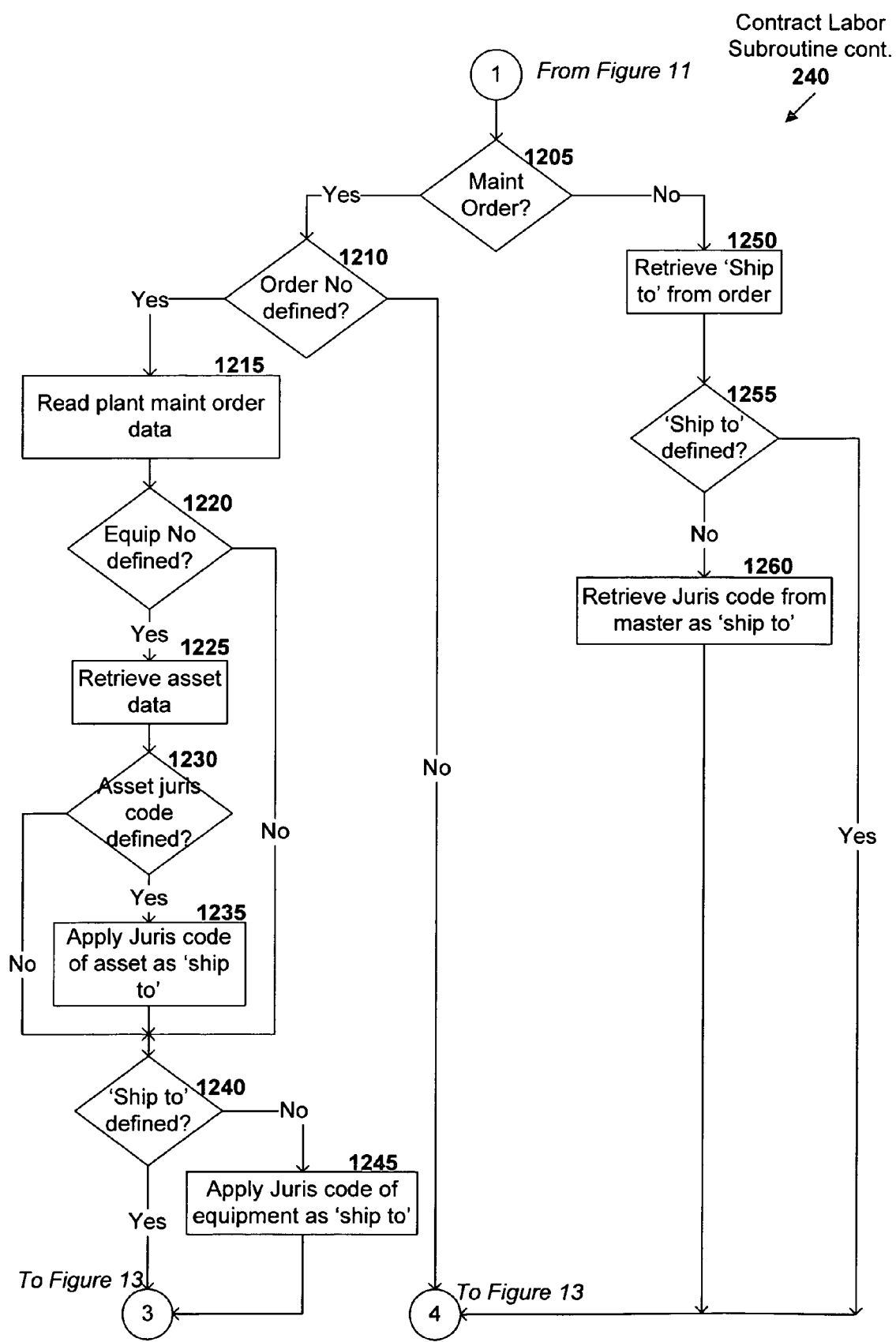
FIG. 12 is a flow diagram that continues from the contract-labor subroutine listed in FIG. 11.

In FIG. 12, the CL subroutine 240 determines if the confirmation document for the actual hours performed is related to a plant maintenance order. If it is related to a plant maintenance order, the "yes" branch is followed from step 1205 to step 1210. In step 1210, the CL subroutine 240 determines if the order number is defined, which means that it looks to see if there is a value in the order number field. If the order number is not defined, the "no" branch is followed from step 1210 to step 1307 (see FIG. 13).

If the order number is filled, the "yes" branch is followed from step 1210 to step 1215. In step 1215, the CL subroutine 240 reads the plant maintenance order to assess relevant data. This relevant data can include the equipment type, functional location, and company data. Step 1215 is followed by the decision step 1220. In this step, the CL subroutine 240 determines if the equipment number is defined or populated. If the equipment number is defined, the CL subroutine 240 follows the "yes" branch from step 1220 to step 1225. In this step, both the asset number and the tax jurisdiction code are retrieved.

Step 1225 is followed by the decision step 1230. In step 1230, the CL subroutine 240 determines if the asset jurisdiction code is defined. In essence, this step assesses whether or not a tax jurisdiction code has been recorded on the asset. If the asset jurisdiction code is defined, the CL subroutine 240 applies the jurisdiction code of the asset as the "ship to" jurisdiction code in step 1235.

Step 1235 is followed by the decision step 1240. In addition, step 1240 also respectively follows with step 1220 when the equipment number is not defined, and step 1230 when the asset jurisdiction code is not defined. In step 1240, the CL subroutine 240 determines whether the "ship to" jurisdiction code is defined. If this code is not defined, the "no" branch is followed from step 1240 to step 1245. In step 1245, the CL subroutine 240 applies the jurisdiction code of the equipment as the "ship to" jurisdiction code. Step 1245 is followed by step 1305, which is described with reference to FIG. 13. If the "ship to" jurisdiction code is defined in step 1240, the "yes" branch is followed from step 1240 to step 1305 (see FIG. 13).

If the confirmation is not for a maintenance order in step 1205, the "no" branch is followed from step 1205 to step 1250. In step 1250, the CL subroutine 240 retrieves the "ship to" jurisdiction code from the order. Decision step 1255 follows step 1250 and determines if the "ship to" jurisdiction code is defined. If the "ship to" jurisdiction code is not defined, the "no" branch is followed from step 1255 to step 1260. In step 1260, the CL subroutine 240 retrieves the jurisdiction code from the project master table and uses this code as the "ship to" jurisdiction code. Step 1260 is followed by the decision step 1307, which is described in FIG. 13. If the "ship to" jurisdiction code is defined in step 1255, the "yes" branch is followed from step 1255 to step 1307, which is subsequently described.

Figure 13:
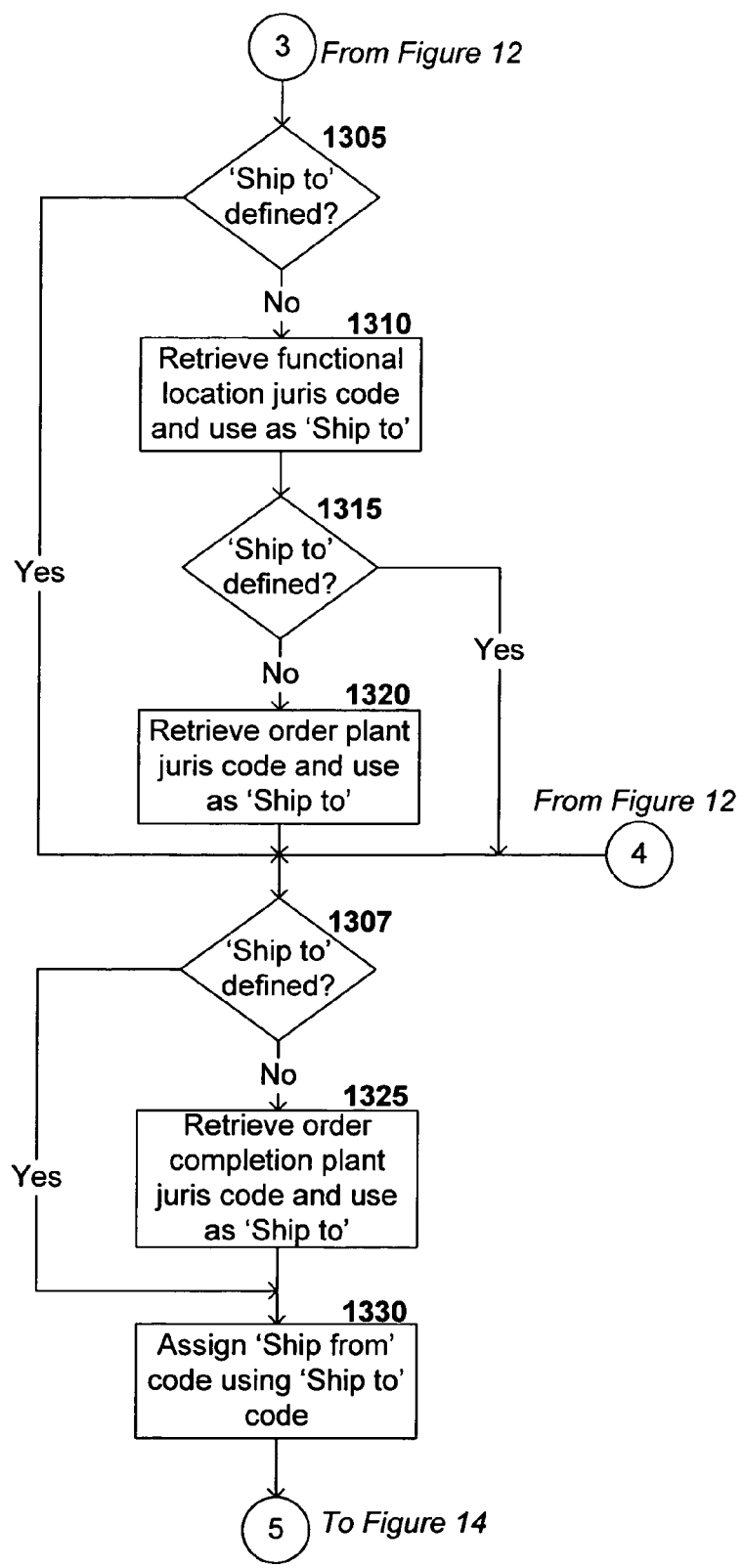
FIG. 13 is a flow diagram that continues from the contract-labor subroutine listed in FIG. 12.

Turning now to FIG. 13, the CL subroutine 240 begins at step 1305 by determining whether or not the "ship to" jurisdiction code is defined. If this code is defined, the "yes" branch is followed from step 1305 to step 1307, where the CL subroutine 240 again determines if the "ship to" jurisdiction code is defined.

If the "ship to" jurisdiction code is not defined in step 1305, the "no" branch is followed from step 1305 to step 1310. In step 1310, the CL subroutine 240 retrieves the jurisdiction code from the functional location record and uses it as the "ship to" jurisdiction code. Step 1310 is followed by the decision step 1315, which also determines if the "ship to" jurisdiction code is defined. If the "ship to" jurisdiction code is now defined, the "yes" branch is followed from step 1315 to step 1307. Otherwise, the "no" branch is followed from step 1315 to step 1320.

In step 1320, the CL subroutine 240 retrieves the jurisdiction code from the order plant record and uses this code as the "ship to" jurisdiction code. Step 1320 is followed by step 1307, which again determines whether or not the "ship to" jurisdiction code is defined. If this code is not defined, the "no" branch is followed from step 1307 to step 1325. Otherwise, the "yes" branch is followed from step 1307 to step 1330. In step 1325, the CL subroutine 240 retrieves the jurisdiction code from the order completion plant and uses it as the "ship to" jurisdiction code. Step 1325 is followed by step 1330. In step 1330, the CL subroutine 240 assigns the "ship from" jurisdiction code using the "ship to" jurisdiction code. That is, the "ship to" jurisdiction code and the "ship from" jurisdiction code are identical. Step 1330 is followed by step 1405, which is described with reference to FIG. 14. One skilled in the art will appreciate that an alternative embodiment can result by connecting the "yes" branches from steps 1305 and 1315 directly to step 1330 instead of the intermediate step 1307.

Figure 14:
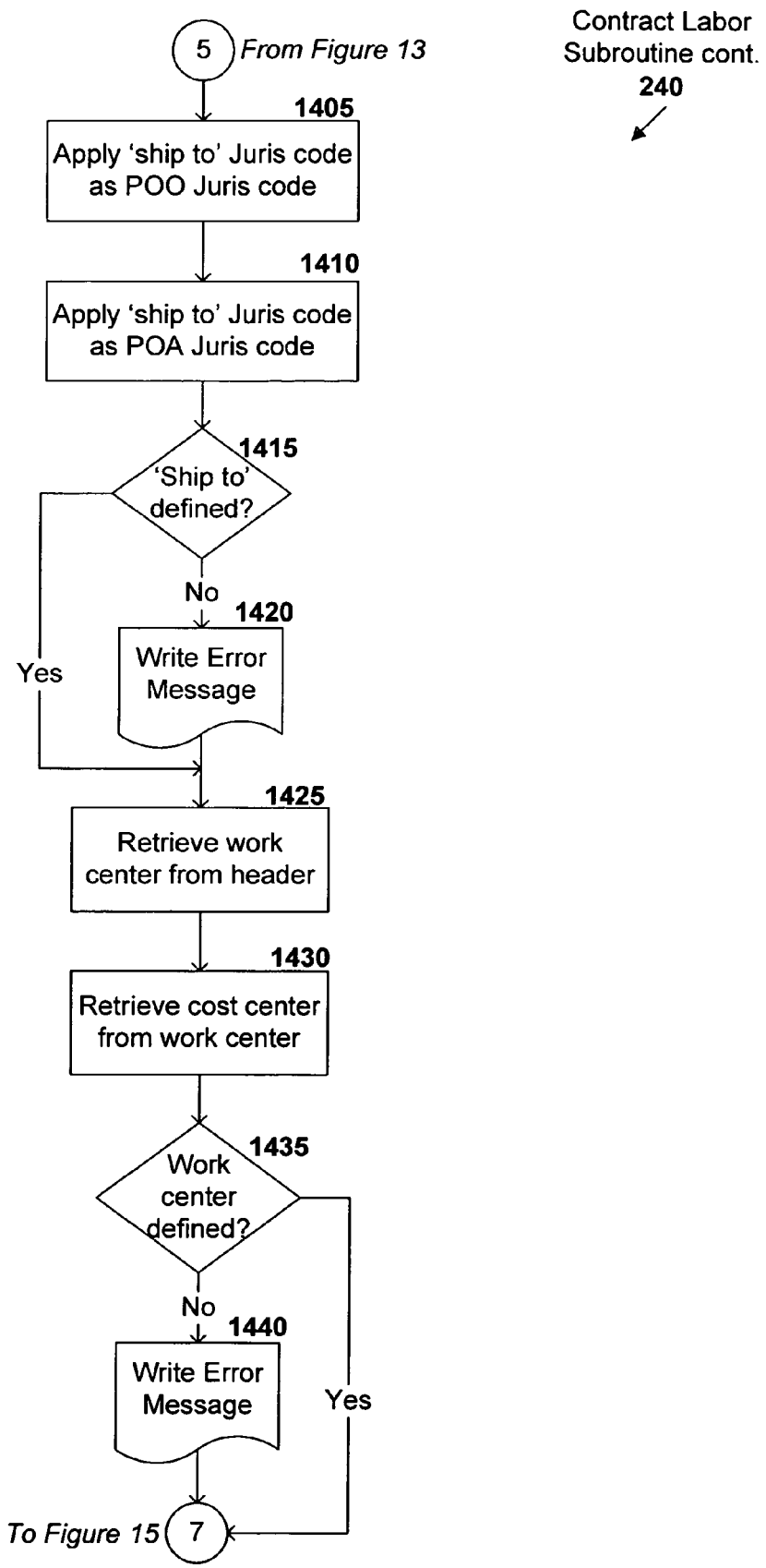
FIG. 14 is a flow diagram that continues from the contract-labor subroutine listed in FIG. 13.

In FIG. 14, the CL subroutine 240 begins at step 1405 by applying the "ship to" jurisdiction code as the point of order origin ("POO") jurisdiction code. Step 1405 is followed by step 1410. In this step, the "ship to" jurisdiction code is used as the point of order acceptance ("POA") jurisdiction code. One skilled in the art will appreciate the fact that the order acceptance location is typically where the vendor accepts an order from a customer. For contract labor services, the order acceptance location is the place where the service is performed, which is also the order origin location.

Step 1410 is followed by the decision step 1415, which determines whether or not the "ship to" jurisdiction code is defined. If the "ship to" jurisdiction code is not defined, the "no" branch is followed from step 1415 to step 1420. In step 1420, the CL subroutine 240 notes that an error has occurred, records the error, and writes a message in an error log. Step 1420 is followed by step 1425. When the "ship to" jurisdiction code is defined in step 1415, the "yes" branch is followed from step 1415 to step 1425. In step 1425, the CL subroutine 240 retrieves the work center location from the work order confirmation. Generally, the data retrieved is from the work order header associated with the work order confirmation. Step 1425 is followed by step 1430. In this step, the CL subroutine 240 retrieves the cost center identified in the work center for the work order confirmation. One skilled in the art will appreciate that the work center facilitates the determination of the labor hour classification, which can include janitorial labor, administrative labor, pipe fitter, or other types of contract laborer.

Step 1430 is followed by the decision step 1435, which determines whether or not the work center is defined. If the work center is not defined, the "no branch" is followed from step 1435 to step 1440. In step 1440, the CL subroutine 240 records the error and writes a message in an error log. Step 1440 is followed by step 1505, which is described in FIG. 15. If the work center was defined in step 1435, the "yes" branch is followed to step 1505 (see FIG. 15).

Figure 15:
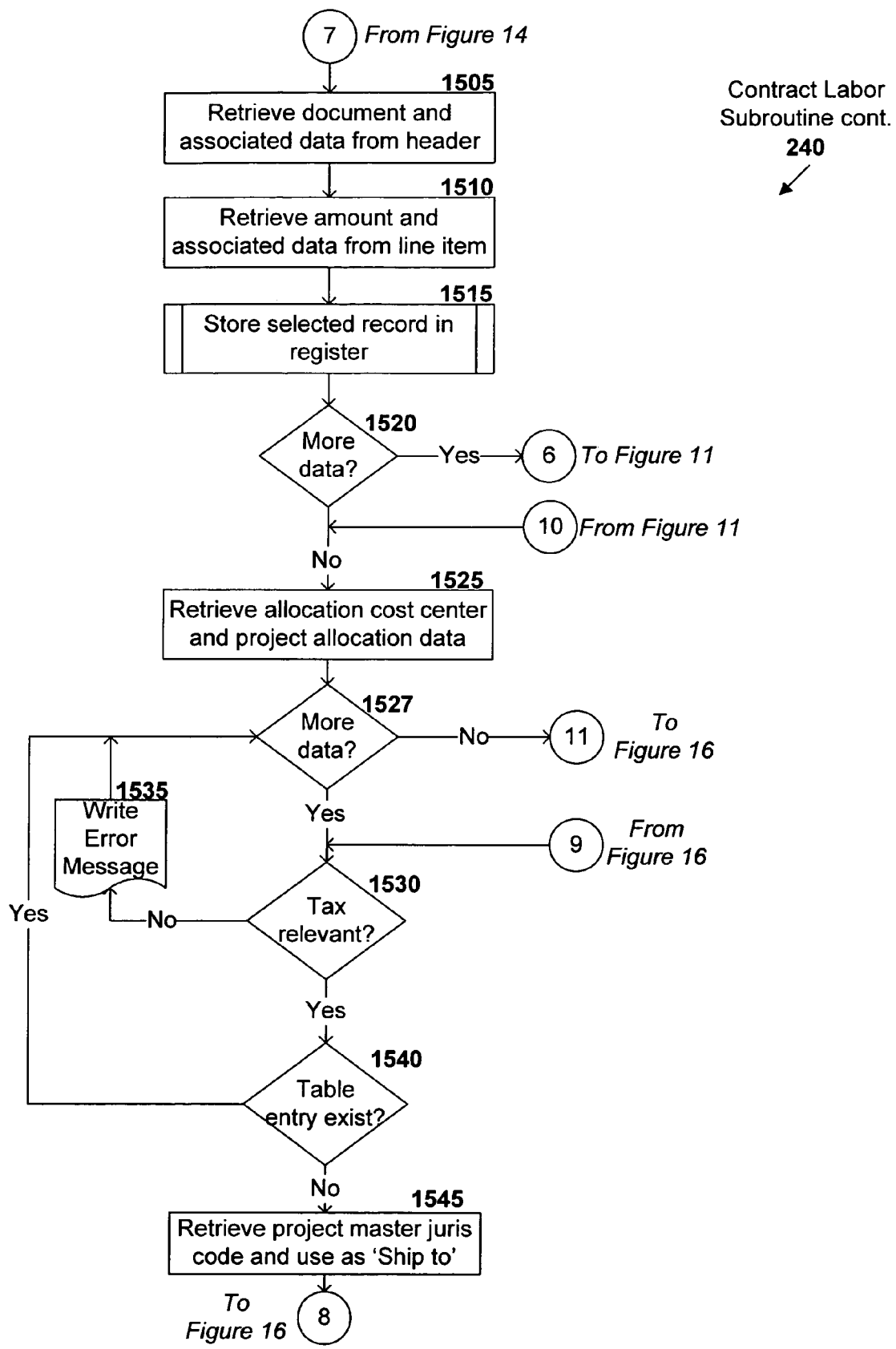
FIG. 15 is a flow diagram that continues from the contract-labor subroutine listed in FIG. 14.

In FIG. 15, the CL subroutine 240 begins at step 1505 by retrieving document data and associated data from the header record. More specifically, the retrieval is accomplished by reading the document number and currency from the cost object header record that is associated with the order confirmation. A person skilled in the art will appreciate that the cost object is a record type where the confirmation hours are stored.

Step 1505 is followed by step 1510, where the CL subroutine 240 retrieves the amount and associated data from the line item. This is generally accomplished by reading the amount and business areas from the cost object line record that is associated with the order confirmation. Step 1510 is followed by step 1515 in which the CL subroutine 240 stores the data associated with the order confirmation details in a register. As described in step 1020 in FIG. 10, this storing routine could be any type of conventional storing subroutine.

Step 1515 is followed by the decision step 1520 in which the CL subroutine 240 determines whether or not there is more data to process. In other words, a decision determines if the record processed is the last order confirmation record. If there is more order data, the "yes" branch is followed from step 1520 to step 1110 (see FIG. 11). If there is no more data, the "no" branch is followed from step 1520 to step 1525.

In step 1525, the CL subroutine 240 retrieves the allocation cost center and the project allocation data. This allocation is part of the main loop designed to determine the tax relevancy of contract project labor. Step 1525 is followed by the decision step 1527 where the CL subroutine 240 determines if there is more data. If there is no more data, the "no" branch is followed from step 1527 to the End step 1635. Otherwise, the "yes" branch is followed from step 1527 to the decision step 1530. In step 1530, the CL subroutine 240 determines whether the activity has any tax relevance. If there is no tax relevance, the "no" branch is followed from step 1530 to step 1535, where an error message is recorded and written to an error log. Step 1535 is followed by step 1527.

If the activity is tax relevant in step 1530, the "yes" branch is followed from step 1530 to step 1540. In this step, the CL subroutine 240 determines if a table entry exists. If a table entry does exist, the "yes" branch is followed from step 1540 to step 1527. Otherwise, the "no" branch is followed from step 1540 to step 1545. In step 1545, the CL subroutine 240 retrieves the jurisdiction code from the project master table and uses this jurisdiction code as the "ship to" jurisdiction code. Step 1545 is followed by step 1605, which is described in FIG. 16.

Figure 16:
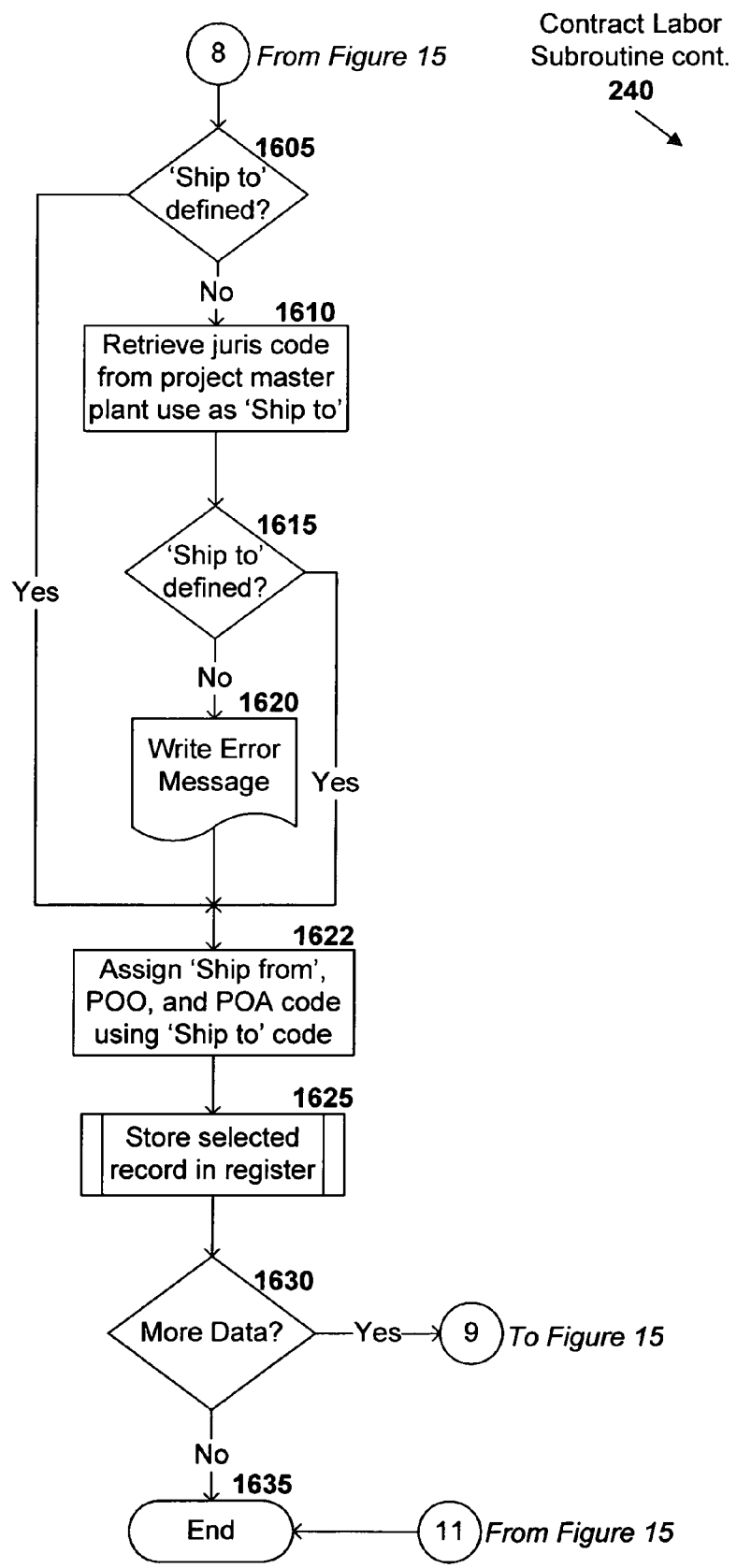
FIG. 16 is a flow diagram that continues from the contract-labor subroutine listed in FIG. 15.

In FIG. 16, the CL subroutine 240 begins at the decision step 1605 by determining if the "ship to" jurisdiction code is defined. If this code is defined, the "yes" branch is followed from step 1605 to step 1622, which is subsequently described. If the "ship to" jurisdiction code is not defined, the "no" branch is followed from step 1605 to step 1610. In step 1610, the CL subroutine 240 retrieves the jurisdiction code from the project master plant record. This retrieved jurisdiction code is used as the "ship to" jurisdiction code.

Step 1610 is followed by the decision step 1615, which determines if the "ship to" jurisdiction code is defined. If this code is not defined, the "no" branch is followed from step 1615 to step 1620. In step 1620, the CL subroutine 240 writes an error message in an error log. Step 1620 is followed by step 1622. Step 1622 also follows steps 1605 and 1615 when the "ship to" jurisdiction code is defined. In step 1622, the CL subroutine 240 uses the "ship to" jurisdiction code to assign the "ship from" jurisdiction code, the point of order origin jurisdiction code, and the point of order acceptance jurisdiction code.

Step 1622 is followed by step 1625 in which the CL subroutine 240 stores the recently assigned jurisdiction codes and the remaining cost center and project allocation data in the tax register using a store subroutine. Step 1625 is followed by the decision step 1630, which determines whether there is any more data to process. More specifically, this step assesses whether or not the last cost center data and project allocation data has been processed. If there is more data, the "yes" branch is followed from step 1630 to step 1530, which is described in FIG. 15. Otherwise, the "no" branch is followed to the End step 1635 and CL subroutine 240 ends.

Figure 17:
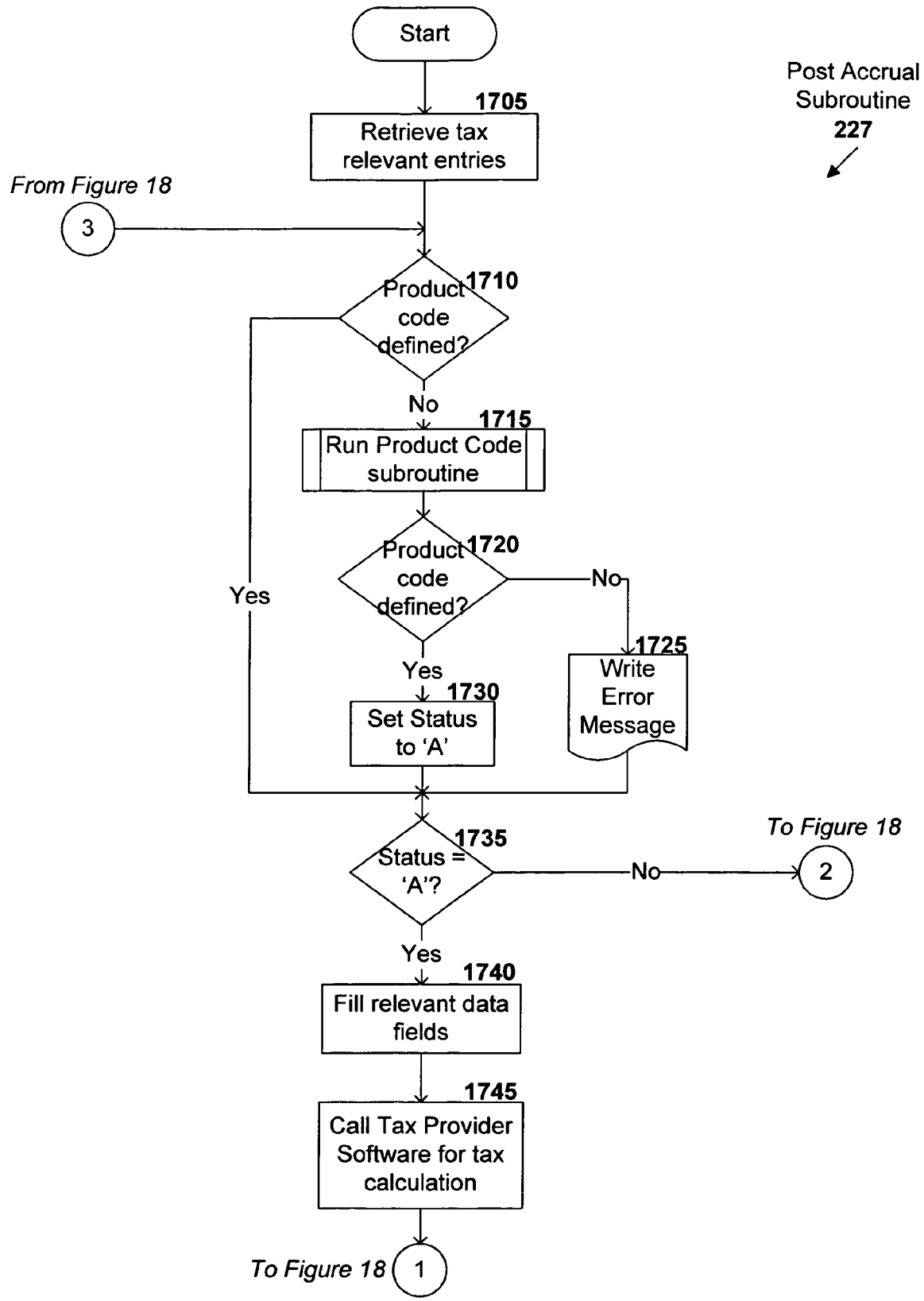
FIG. 17 is a flow diagram for the beginning of the post-accrual subroutine listed in FIG. 2.
Figure 18:
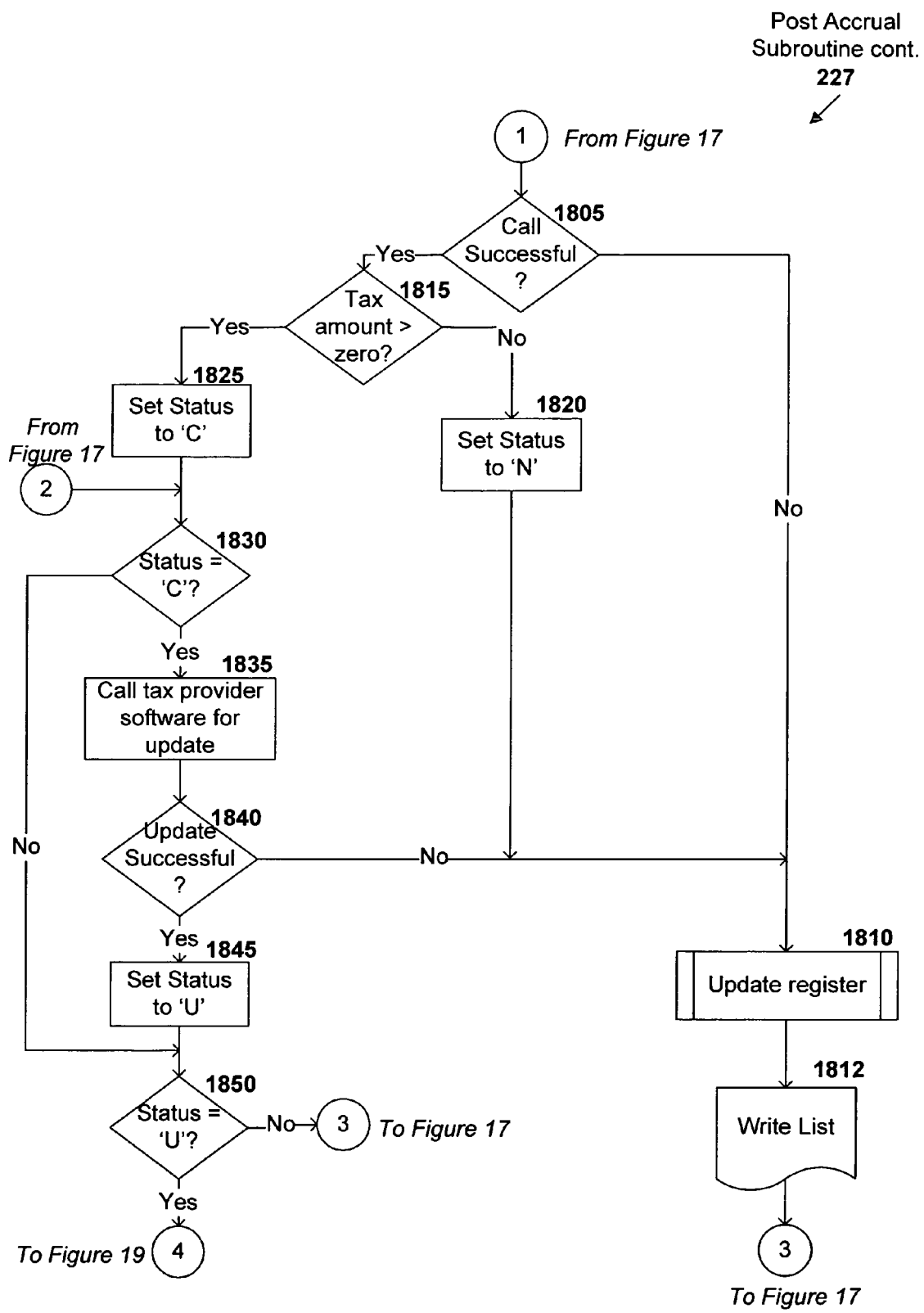
FIG. 18 is a flow diagram that continues from the post-accrual subroutine listed in FIG. 17.
Figure 19:
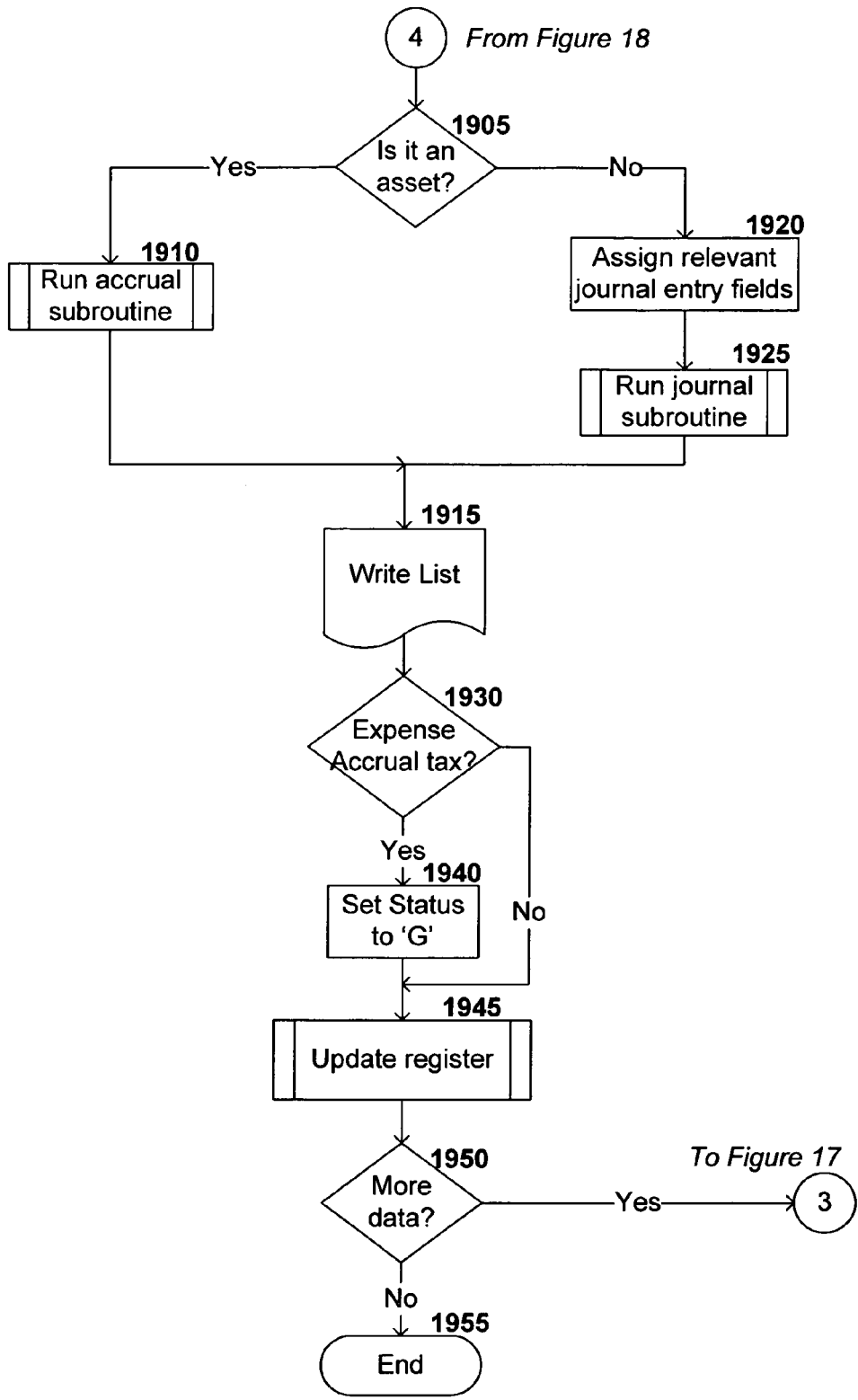
FIG. 19 is a flow diagram that continues from the post-accrual subroutine listed in FIG. 18.

FIGS. 17 through 19 illustrate the processes for the post accrual subroutine 227, which follows step 226 (see FIG. 2). The post accrual subroutine 227 is used in conjunction with the GI subroutine 225 and the CL subroutine 240. As the GI subroutine 225 and CL subroutine 240 identify potentially taxable transactions and store these transactions in registers, the post accrual subroutine 227 then periodically reviews these registers. This subroutine may recur after a predefined interval and is considered a batch process. When the post accrual subroutine 227 identifies a transaction in the register that has not been processed, this subroutine attempts to assign a product code and calculate the appropriate tax. The post accrual subroutine 227 continues processing GI and CL transactions for the selected period. Each transaction maintains a status that identifies the remaining processing steps. The post accrual subroutine 227 assigns a product code to each line item and performs a tax calculation routine. Each taxable transaction is recorded within the complex tax calculation software 170 tax register (see FIG. 1B) and a financial document is created to expense and accrue the tax amounts.

The post accrual subroutine 227 begins at step 1705, in FIG. 17, by retrieving tax relevant entries. Records with the status 'N' (not tax relevant) and status 'G' (accrual generated) will generally be identified as fully processed. One skilled in the art will appreciate that all records with a different status will be selected. Step 1705 is followed by the decision step 1710, which determines if the product code is defined. If the product code is not defined, the post accrual subroutine 227 follows the "no" branch from step 1710 to step 1715. In step 1715, the post accrual subroutine 227 runs the product code subroutine 265, which was described in detail in FIG. 4.

Step 1715 is followed by the decision step 1720, which determines if the product code is defined. If the product code is not defined, post accrual subroutine 227 follows the "no" branch from step 1720 to step 1725. In step 1725, the post accrual subroutine 227 generates an error message in the error log. If the product code is defined in step 1720, this subroutine follows the "yes" branch from step 1720 to step 1730. In step 1730, the post accrual subroutine 227 designates the status of the record to 'A', signifying that the product code is assigned.

Step 1735 follows both step 1725 and step 1730. In addition, step 1735 follows step 1710 when the product code is defined. In step 1735, the post accrual subroutine 227 determines if the record has a status of 'A'. If the record does not have a status of 'A', the "no" branch is followed from step 1735 to step 1830, which is described in FIG. 18. If the record has a status of 'A', the "yes" branch is followed from step 1735 to step 1740. In step 1740, the post accrual subroutine 227 assigns the relevant data fields. When implemented with SAP R/3, this step essentially fills the fields needed for the remote function call (RFC_CALCULATE_TAXES_DOC). More generally, this step completes all the fields that the complex tax calculation software 170 needs as inputs to perform a tax calculation. Step 1740 is followed by step 1745, which calls the complex tax calculation software 170 (see FIG. 1B). Step 1745 is followed by step 1805, which is described in greater detail in FIG. 18.

In FIG. 18, the post accrual subroutine 227 begins at step 1805 by determining whether or not the call to the complex tax calculation software 170 is successful. If the call is not successful, the "no" branch is followed from step 1805 to step 1810. In step 1810, the post accrual subroutine 227 updates the use tax register 157 (see FIG. 1B) by using the update subroutine. One skilled in the art will appreciate that this update subroutine could be any one of many conventional update subroutines used in conjunction with complex tax calculation software 170. Step 1810 is followed by step 1812. In step 1812, the post accrual subroutine 227 writes the update record to the output report. Step 1812 is followed by step 1710, which is described in FIG. 17.

If the call is successful in step 1805, the "yes" branch is followed from step 1805 to step 1815. In step 1815, the post accrual subroutine 227 determines if the calculated tax amount is greater than zero. If the tax amount is not greater than zero, the "no" branch is followed from step 1815 to step 1820. In step 1820, the post accrual subroutine 227 sets the status to 'N' because no taxes are accrued or required. Step 1820 is followed by step 1810, which was previously described.

If the tax amount is greater than zero in step 1815, the "yes" branch is followed from step 1815 to step 1825. In step 1825, the post accrual subroutine 227 sets the status of the record to 'C' (for tax amount calculated). Step 1825 is followed by step 1830, which determines whether the record has a status of 'C'. If the record status is 'C', the post accrual subroutine 227 goes to step 1835 and assigns the relevant data fields for the update. When used with SAP, this subroutine fills the fields that are necessary for the SAP standard remote function call (RFC_UPDATE_TAXES_DOC) to the complex tax calculation software 170 to update the transaction to the audit register. More generally, the post accrual subroutine 227 completes the data fields needed by the complex tax calculation software 170 to update the transaction to the audit register.

Step 1835 is followed by the decision step 1840. In step 1840, the post accrual subroutine 227 determines if the update is successful. If the update is not successful, the "no" branch is followed to step 1810, which was previously described. Otherwise, the "yes" branch is followed from step 1840 to step 1845. In step 1845, the post accrual subroutine 227 designates the record status as 'U', indicating that the transaction is updated in the complex tax calculation software 170. Step 1850 follows both step 1830 when the status of the record is not 'C' and step 1845. Step 1850 determines if the record status is 'U'. If the status is not 'U', the "no" branch is followed from step 1850 to step 1710, which is described in FIG. 17. Otherwise, the "yes" branch is followed from step 1850 to step 1905, which is described in FIG. 19.

In FIG. 19, the post accrual subroutine 227 begins with step 1905 by determining if the account assignment is for an asset. If it is for an asset, the "yes" branch is followed from step 1905 to step 1910. In step 1910, the post accrual subroutine 227 runs the accrual subroutine that facilitates posting an accrual for the calculated taxes. For SAP R/3, this step involves using call transaction for FB01 (Post Document). Step 1910 is followed by step 1915. In this step, the post accrual subroutine 227 writes the updated record to the output report.

If, in step 1905, the account assignment is not for an asset, the "no" branch is followed to step 1920. In this step, the post accrual subroutine 227 assigns relevant journal entry fields. For SAP R/3, this step involves completing fields needed for calculating taxes using SAP BAPI (BAPI_ACC_GL_POSTING_POST). Step 1920 is followed by step 1925, where the post accrual subroutine 227 runs the journal subroutine 1925 that facilitates posting of a journal entry for the above-mentioned BAPI. Step 1925 is followed by step 1915, which is described above.

Step 1915 is followed by the decision step 1930, which determines if a journal entry to expense and accrue any calculated use tax was created. If there is no reason to expense and accrue tax in step 1930, the "no" branch is followed from step 1930 to step 1945, as described below. If there is a reason to expense and accrue tax, the "yes" branch is followed from step 1930 to step 1940. In step 1940, the post accrual subroutine 227 sets the record status to 'G' (for accrual generated). Step 1940 is followed by step 1945, which runs the update register subroutine. As can be appreciated by one skilled in the art, this subroutine is similar to the subroutine described in step 1810 of FIG. 18. Step 1945 is followed by the decision step 1950, which determines if there is more data required for processing. If there is more data, the "yes" branch is followed from step 1950 to step 1710 (see FIG. 17). Otherwise, the "no" branch is followed from step 1950 to the End step 1955 and the post accrual subroutine 227 ends.

Description of the System's Benefits

The invented dynamic, rule-based, tax-decision system 100 that uses dynamic, rule-based, tax-decision software 150 creates substantial advantages over currently available systems by enhancing functionality in some areas, while providing new functionality in other areas. For example, the invented system can identify relevant GI transactions, assign more accurate product codes, and therefore, obtain a more appropriate use tax calculation. Similarly, the invented system can identify tax relevant hours listed on plant maintenance work orders, projects, or internal orders assign accurate product codes, and therefore, obtain a more appropriate use tax calculation. Additionally, the dynamic, rule-based, tax-decision system 100 facilitates more accurate tax determination by providing a more accurate determination of the "ship-from" jurisdiction code by allowing multi-vendor addresses and assessing the most accurate address for assignment of the "ship-from" jurisdiction code. The defined rules may be adjusted as business processes change. These adjustments can be applied by updating the rule-based configuration settings, without the need to perform programmatic changes. Finally, the invented system allows a more dynamic evaluation of the product code that considers current system implementation when the code is elected, which also facilitates a more accurate tax determination.

The particular embodiments disclosed above are illustrative only, as the invention may be modified and practiced in different, but equivalent, manners apparent to those skilled in the art and having the benefit of the teachings herein. Furthermore, no limitations are intended to the details of construction or design herein shown, other than as described in the claims below. It is, therefore, evident that the particular embodiments disclosed above may be modified and all such variations may be considered within the scope and spirit of the invention. Accordingly, the protection sought herein is set forth in the claims below.

The inventors claim:

1. A computer-implemented method for determining taxably relevant data associated with a transaction, comprising the steps of:
   receiving, by a computer, data associated with the transaction;
   determining, by the computer, a tax category code by processing the data;
   determining, by the computer, a product code using singularly defined business rules and the data by
      associating the singularly defined rules with a plurality of product categories,
      determining a product associated with the transaction,
      identifying a first rule within the singularly defined rules that is associated with the category for the product
      applying the first rule to the first transaction, and
      determining the product code by applying the first rule to the transaction;
   determining, by the computer, a destination jurisdiction code by processing the data associated with the transaction;
   determining, by the computer, a point of order origin jurisdiction code using the destination jurisdiction code;
   determining, by the computer, an originating jurisdiction code by iterating through a hierarchy of potential ship from jurisdiction codes using the singularly defined business rules until one of the potential ship from jurisdiction codes is selected as the originating jurisdiction code; and
   determining, by the computer, a point of order acceptance jurisdiction code by processing the originating jurisdiction code and the destination jurisdiction code;
   wherein the taxably relevant data is thereby determined.

2. The computer-implemented method of claim 1, wherein the transaction is associated with varying items in an inventory.

3. The computer-implemented method of claim 1, wherein the data associated with the transaction is data associated with payment of contract laborers for services rendered.

4. The computer-implemented method of claim 1, wherein processing the data includes displaying available tax category codes and requesting selection of the tax category code by a user.

5. The computer-implemented method of claim 1, wherein determining, by the computer, the product code further comprises the steps of:
- determining whether there is a pointer to the location of the first rule;
- attempting to retrieve the first rule when there is a pointer to the location of the first rule;
- determining the product code by retrieving the first rule when there is a pointer and applying the first rule to the transaction.

6. A system for determining taxably relevant data associated with a transaction using singularly defined rules, comprising:
- a processor; and
- a memory storage device coupled to receive and transmit signals to the processor, wherein the memory storage device includes software for determining taxably relevant data associated with a transaction, and the software comprises the steps of:
  - determining a tax category code by processing data associated with a transaction;
  - determining a product code using singularly defined business rules and the transaction data by
    - associating the singularly defined rules with a plurality of product categories,
    - determining a product associated with the transaction,
    - identifying a first rule within the singularly defined rules that is associated with the category for the product
    - applying the first rule to the first transaction, and
    - determining the product code by applying the first rule to the transaction;
  - determining a destination jurisdiction code by processing the data associated with the transaction;
  - determining a point of order origin jurisdiction code using the destination jurisdiction code;
  - determining an originating jurisdiction code by iterating through a hierarchy of potential ship from jurisdiction codes using the singularly defined business rules until one of the potential ship from jurisdiction codes is selected as the originating jurisdiction code; and
  - determining a point of order acceptance jurisdiction code by processing the originating jurisdiction code and the destination jurisdiction code;
  - wherein the taxably relevant data is thereby determined using said tax category code, said product code, said point of order origin jurisdiction code, said destination jurisdiction code, said point of order acceptance jurisdiction code, and said originating jurisdiction code.

7. The system of claim 6, wherein the processor transmits tax relevant data signals to an external device having tax calculation software.

8. The system of claim 7, wherein the external device is a computer.

9. The system of claim 6, wherein the transaction is associated with varying items in an inventory.

10. The system of claim 6, wherein the transaction comprises payment for services rendered.

11. A computer program product comprising at least one computer-readable storage medium having computer-executable program code portions stored therein, said computer-executable program code portions for determining taxably relevant data associated with a transaction having instructions comprising the steps of:
- determining a tax category code by processing data associated with a transaction;
- determining a product code using singularly defined business rules and the data by
  - associating the singularly defined rules with a plurality of product categories,
  - determining a product associated with the transaction,
  - identifying a first rule within the singularly defined rules that is associated with the category for the product
  - applying the first rule to the first transaction, and
  - determining the product code by applying the first rule to the transaction;
- determining a destination jurisdiction code processing the data associated with a transaction;
- determining a point of order origin jurisdiction code using the destination jurisdiction code;
- determining an originating jurisdiction code by iterating through a hierarchy of potential ship from jurisdiction codes using the singularly defined business rules until one of the potential ship from jurisdiction codes is selected as an originating jurisdiction code; and
- determining a point of order acceptance jurisdiction code by processing the originating jurisdiction code and the destination jurisdiction code;
- wherein the taxably relevant data is thereby determined using said tax category code, said product code, said point of order origin jurisdiction code, said destination jurisdiction code, said point of order acceptance jurisdiction code, and said originating jurisdiction code.

12. The computer program product of claim 11, wherein the transaction is associated with varying items in an inventory.

13. The computer program product of claim 11, wherein the transaction comprises payment for services rendered.

14. The computer program product of claim 11, wherein processing the data includes displaying available tax category codes and requesting selection of the tax category code by a user.

15. The computer program product of claim 11, wherein the computer-executable program code portions for determining the product code further comprises computer-executable program code portions for:
- determining whether there is a pointer to the location of the first rule;
- attempting to retrieve the first rule when there is a pointer to the location of the first rule;
- determining the product code in response to retrieving the first rule when there is a pointer and applying the first rule to the transaction.

* * * * *